US012262275B2

(12) United States Patent
Deenoo et al.

(10) Patent No.: US 12,262,275 B2
(45) Date of Patent: Mar. 25, 2025

(54) CONDITIONAL MOBILITY WITH MULTI-CONNECTIVITY

(71) Applicant: InterDigital Patent Holdings, Inc., Wilmington, DE (US)

(72) Inventors: Yugeswar Deenoo, Chalfont, PA (US); Martino M. Freda, Laval (CA); Ghyslain Pelletier, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 437 days.

(21) Appl. No.: 17/764,869

(22) PCT Filed: Sep. 29, 2020

(86) PCT No.: PCT/US2020/053215
§ 371 (c)(1),
(2) Date: Mar. 29, 2022

(87) PCT Pub. No.: WO2021/067236
PCT Pub. Date: Apr. 8, 2021

(65) Prior Publication Data
US 2022/0394583 A1 Dec. 8, 2022

Related U.S. Application Data

(60) Provisional application No. 63/061,225, filed on Aug. 5, 2020, provisional application No. 62/972,842, filed (Continued)

(51) Int. Cl.
*H04W 36/30* (2009.01)
*H04W 24/08* (2009.01)
(Continued)

(52) U.S. Cl.
CPC ......... *H04W 36/305* (2018.08); *H04W 24/08* (2013.01); *H04W 74/0841* (2013.01); *H04W 76/20* (2018.02); *H04W 36/362* (2023.05)

(58) Field of Classification Search
None
See application file for complete search history.

(56) References Cited

U.S. PATENT DOCUMENTS 11,323,943 B2    5/2022   Lin et al.
2014/0056243 A1* 2/2014   Pelletier ............... H04L 5/0032
                                              370/329

(Continued)

FOREIGN PATENT DOCUMENTS

CN    108810960 A    11/2018
CN    111567093 A    8/2020
(Continued)

OTHER PUBLICATIONS

Zhongda, Du, "Analysis of Key Technologies and Development Prospects for Dual Connectivity", Telecommunications Network Technology No. 11, Nov. 11, 2014, pp. 1-16.

(Continued)

*Primary Examiner* — Charles N Appiah
*Assistant Examiner* — Frank E Donado
(74) *Attorney, Agent, or Firm* — Condo Roccia Koptiw LLP

(57) ABSTRACT

Systems, methods and instrumentalities are described herein with respect to the mobility and multi-connectivity of wireless transmit receive units. These devices may be configured to perform conditional handovers and/or conditional second cell group reconfigurations including primary secondary cell additions or changes. The devices may exchange information with a network while performing the conditional reconfigurations and/or conditional handovers. The devices may (Continued)

be configured with rules to handle concurrent handover and reconfiguration tasks.

20 Claims, 9 Drawing Sheets

Related U.S. Application Data on Feb. 11, 2020, provisional application No. 62/930,891, filed on Nov. 5, 2019, provisional application No. 62/908,876, filed on Oct. 1, 2019.

(51) Int. Cl.
*H04W 74/0833* (2024.01)
*H04W 76/20* (2018.01)
*H04W 36/36* (2009.01)

(56) References Cited

U.S. PATENT DOCUMENTS

| | | | |
|---|---|---|---|
| 2014/0313987 | A1 | 10/2014 | Zhang et al. |
| 2014/0335861 | A1* | 11/2014 | De Benedittis ... H04W 36/0061 455/436 |
| 2015/0003372 | A1 | 1/2015 | Raaf et al. |
| 2015/0029955 | A1 | 1/2015 | Heo et al. |
| 2015/0126199 | A1* | 5/2015 | Hamabe ............ H04W 36/0094 455/437 |
| 2015/0195757 | A1* | 7/2015 | Tietz .................... H04W 36/08 455/438 |
| 2015/0223149 | A1 | 8/2015 | Liu et al. |
| 2018/0124612 | A1 | 5/2018 | Babaei et al. |
| 2018/0124831 | A1 | 5/2018 | Dinan |
| 2019/0223073 | A1 | 7/2019 | Chen et al. |
| 2019/0253978 | A1 | 8/2019 | Pelletier et al. |
| 2020/0022215 | A1 | 1/2020 | Takahashi et al. |
| 2022/0086704 | A1 | 3/2022 | Futaki et al. |
| 2022/0240141 | A1* | 7/2022 | Ma .................... H04W 36/0088 |
| 2022/0322174 | A1* | 10/2022 | Da Silva ............... H04W 76/19 |
| 2022/0408322 | A1* | 12/2022 | Uchino ........... H04W 36/00692 |
| 2024/0121651 | A1* | 4/2024 | Fan ....................... H04W 24/08 |
| 2024/0129983 | A1* | 4/2024 | Yilmaz ................. H04W 76/19 |

FOREIGN PATENT DOCUMENTS

| | | |
|---|---|---|
| CN | 113545120 A | 10/2021 |
| JP | 2016519529 A | 6/2016 |
| JP | 2021-510272 A | 4/2021 |
| KR | 10-2020-0102497 A | 8/2020 |
| WO | 2018174038 A1 | 9/2018 |
| WO | 2019099463 A1 | 5/2019 |
| WO | 2019/137453 A1 | 7/2019 |
| WO | 2020/144919 A1 | 7/2020 |

OTHER PUBLICATIONS

3rd Generation Partnership Project (3GPP), R2-141164, "Reporting Connection Problems of SCG Towards MeNB", Huawei, HiSilicon, 3GPP TSG-RAN WG2 Meeting #85bis, Valencia, Spain, Mar. 31-Apr. 4, 2014, pp. 1-3.

3rd Generation Partnership Project (3GPP), R2-1906082, "Conditional PSCell Addition", MediaTek Inc., 3GPP TSG-RAN WG2 #106, Reno, Nevada, USA, May 13-17, 2019, 3 pages.

3rd Generation Partnership Project (3GPP), R2-1915962, "Report on Email Discussion [107b#52] [NR MobE] Open Issues Conditional PSCell Addition/Change (CATT)", CATT (Rapporteur), 3GPP TSG-RAN WG2 Meeting #108, Reno, USA, Nov. 18-22, 2019, 46 pages.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.

3rd Generation Partnership Project (3GPP), TS 38.331 V15.4.0, "Technical Specification Group Radio Access Network, NR, Radio Resource Control (RRC) Protocol Specification (Release 15)", Dec. 2018, pp. 1-474.

3rd Generation Partnership Project (3GPP), R2-1909144, "Reuse of Conditional Handover for SCG Change in NR-DC", NEC, 3GPP TSG-RAN WG2 #107, Prague, Czech Republic, Aug. 26-30, 2019, 4 pages.

3rd Generation Partnership Project (3GPP), R2-1910744, "Discussion on Applying CHO based SCG mobility", ZTE Corporation, Sanechips, 3GPP TSG RAN WG2 Meeting #107, Prague, Czech Republic, Aug. 26-30, 2019, 5 pages.

3rd Generation Partnership Project (3GPP), R2-1911331, "Study on Application of CHO Mechanism to Conditional PSCell Addition/Change", NTT Docomo, Inc., 3GPP TSG-RAN WG2 Meeting #107, Prague, Czech, Aug. 26-30, 2019, 5 pages.

3rd Generation Partnership Project, 3GPP R2-1908679, "Introducing suspension of SCG", 3GPP TSG RAN WG2 Meeting #107; Agenda item: 11.10.4.4; Source: Qualcomm Incorporated, Aug 26-30, 4 pages.

3rd Generation Partnership Project, 3GPP R4-1802688, 3GPP TSG-RAN WG4 Meeting #86; Athens, Greece, Feb. 26-Mar. 2, 2018, 3 pages.

* cited by examiner

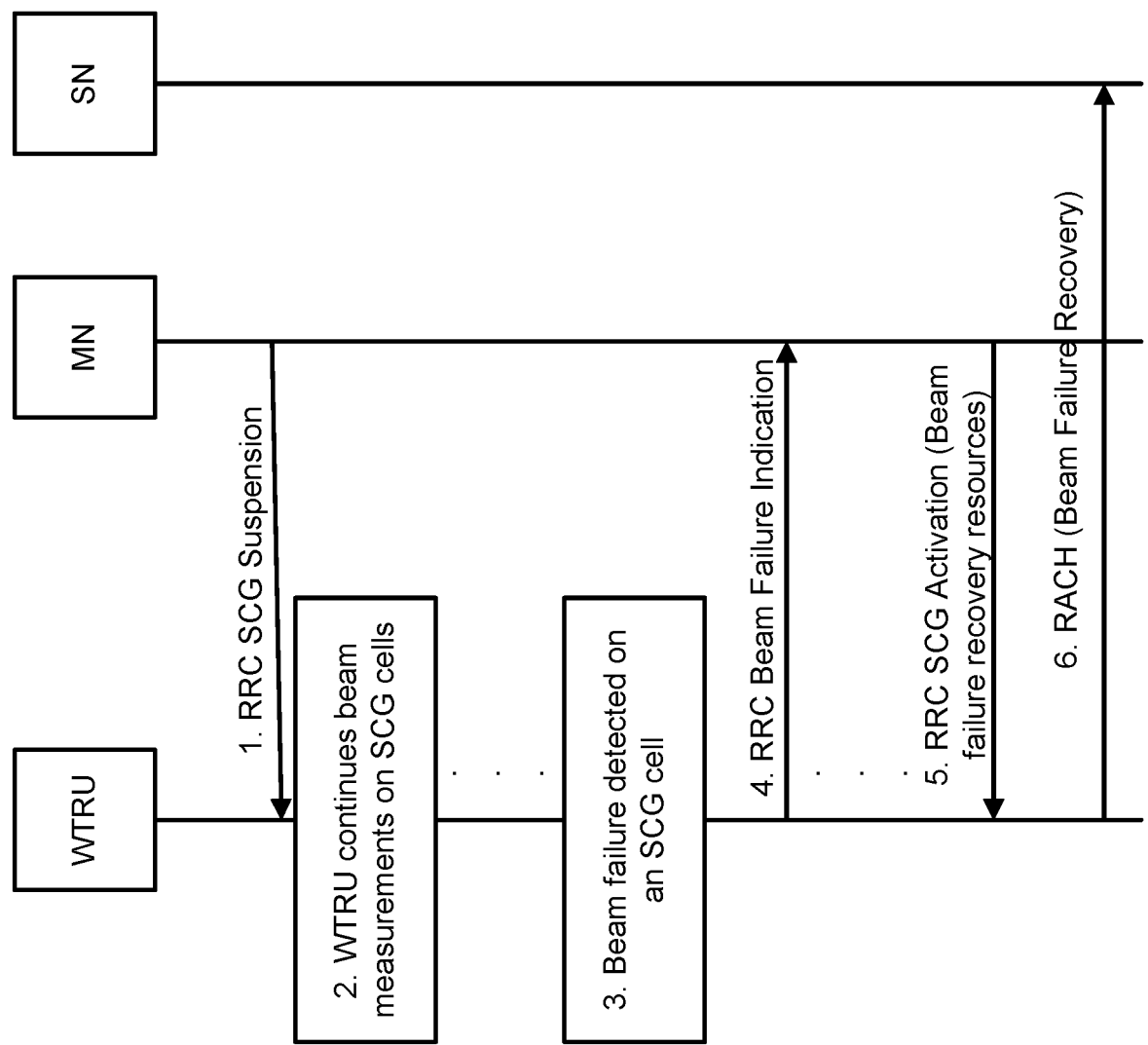

US 12,262,275 B2

CONDITIONAL MOBILITY WITH MULTI-CONNECTIVITY

CROSS-REFERENCE TO RELATED APPLICATIONS

This application is the National Stage Entry under 35 U.S.C. § 371 of Patent Cooperation Treaty Application No. PCT/US2020/053215, filed Sep. 29, 2020, which claims the benefit of Provisional U.S. Patent Application No. 62/908,876, filed Oct. 1, 2019, Provisional U.S. Patent Application No. 62/930,891, filed Nov. 5, 2019, Provisional U.S. Patent Application No. 62/972,842, filed Feb. 11, 2020, and Provisional U.S. Patent Application No. 63/061,225, filed Aug. 5, 2020, the disclosures of which are incorporated herein by reference in their entireties.

BACKGROUND

Mobile communications are in continuous evolution and are already in their fifth generation—5G. A wireless transmit receive unit (WTRU) may be configured with multiple connectivities. For example, the WTRU may be configured to communicate with two network nodes that may be connected via a backhaul. The network nodes may provide network access to the WTRU using a same radio access technology (RAT) or using different RATs. The WTRU may transmit messages to or receive messages from the network nodes. The WTRU and the network nodes may determine each other's conditions and/or states via the messaging.

SUMMARY

Systems, methods and instrumentalities are described herein for handling mobility and multi-connectivity related tasks associated with a wireless transmit receive unit (WTRU). A WTRU as described herein may receive a radio resource control (RRC) message from a network entity, where the RRC message may indicate a conditional reconfiguration to be applied by the WTRU and a condition (e.g., a measurement condition) for application of the conditional reconfiguration. The conditional reconfiguration may be associated with a primary secondary cell (PSCell) change, a PSCell addition, a secondary cell group (SCG) change, an SCG addition, etc. The RRC message may indicate a plurality of candidate PSCells associated with the conditional reconfiguration. Responsive to receiving the RRC message, the WTRU may transmit a first message to the network entity and indicate in the first message that the WTRU has received the RRC message. The WTRU may monitor for the condition for application of the conditional reconfiguration and may determine that the condition for application of the conditional reconfiguration is satisfied. The WTRU may (e.g., based on the determination that the condition for application of the conditional reconfiguration is satisfied) transmit a second message to the network entity, where the second message may indicate that the condition for application of the conditional reconfiguration is satisfied. The WTRU may apply the conditional reconfiguration. In some scenarios, the WTRU may determine that the application of the conditional reconfiguration has resulted in a failure. Responsive to such a failure, the WTRU may transmit a third message to the network entity, where the third message may indicate the failure to the network entity.

The network entity described herein may be associated with a master cell group (MCG) of the WTRU and the WTRU may be configured to transmit at least one of the first, second or third message in the MCG. The WTRU may receive a conditional handover command from the network entity while the conditional reconfiguration is still pending, and the WTRU may prioritize performance of the conditional handover command over performance of the conditional reconfiguration.

BRIEF DESCRIPTION OF THE DRAWINGS

FIG. 2 is a diagram illustrating example timing for beam failure reporting, beam failure configurations, and beam failure recovery.

DETAILED DESCRIPTION

Figure 1A:
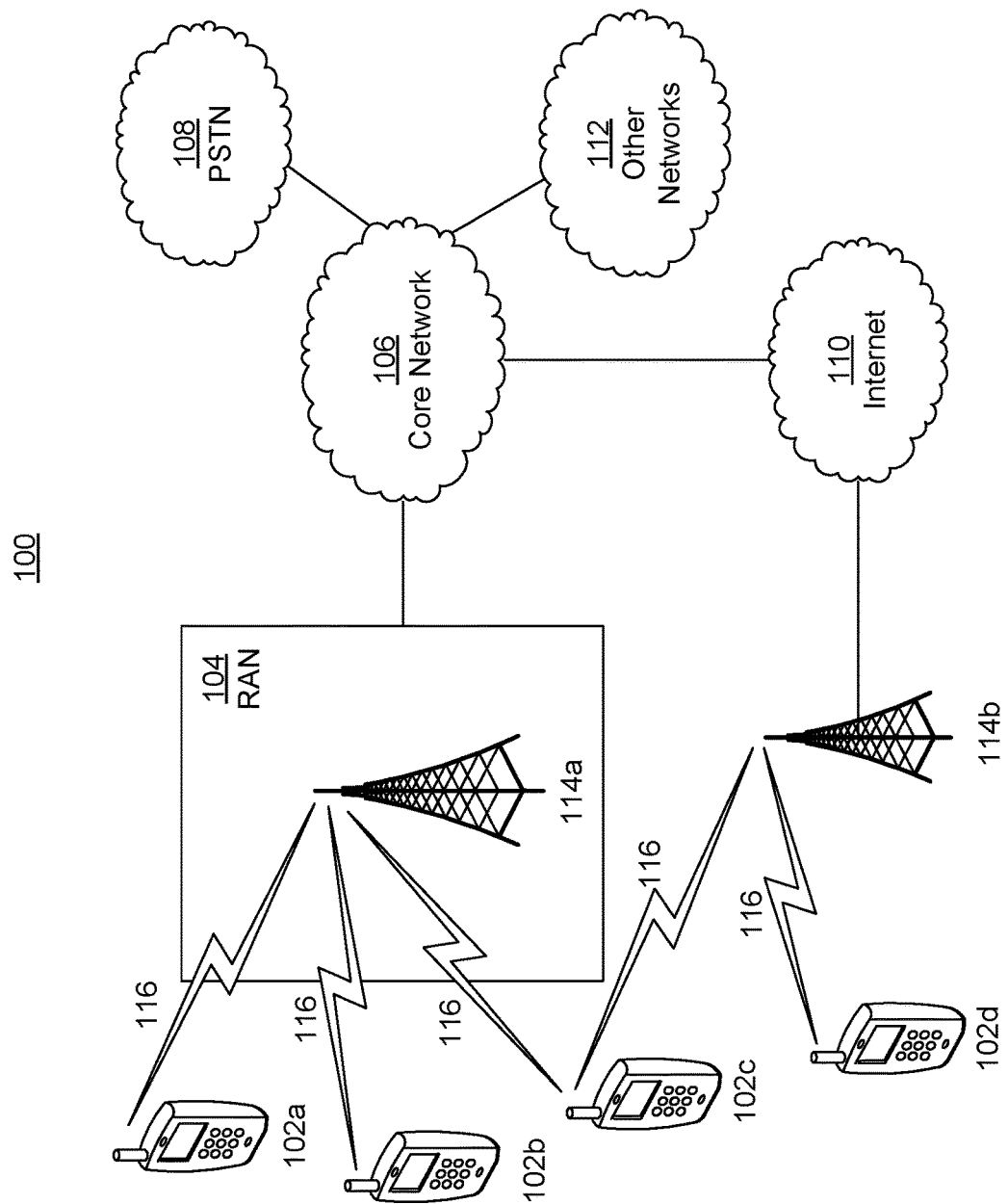
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
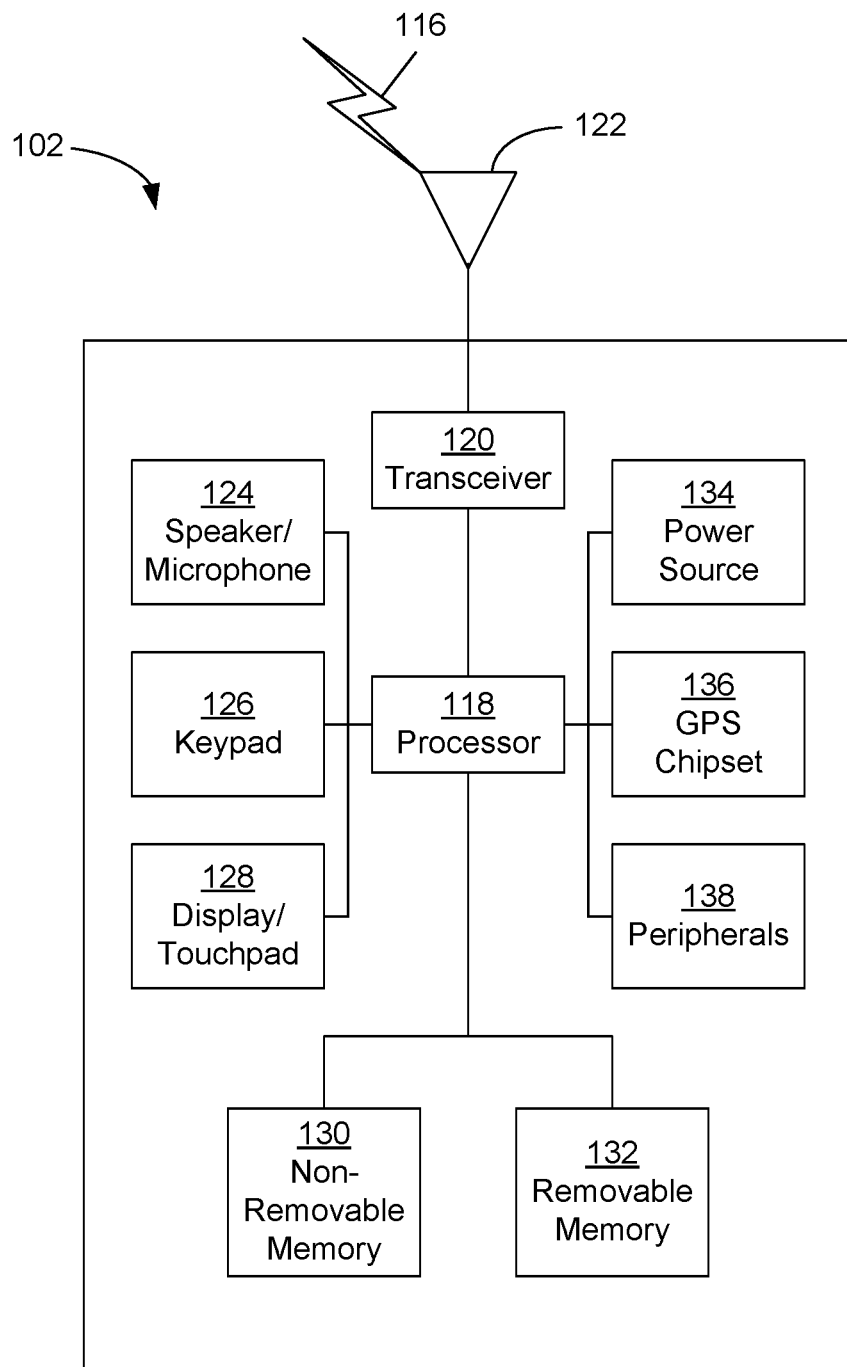
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
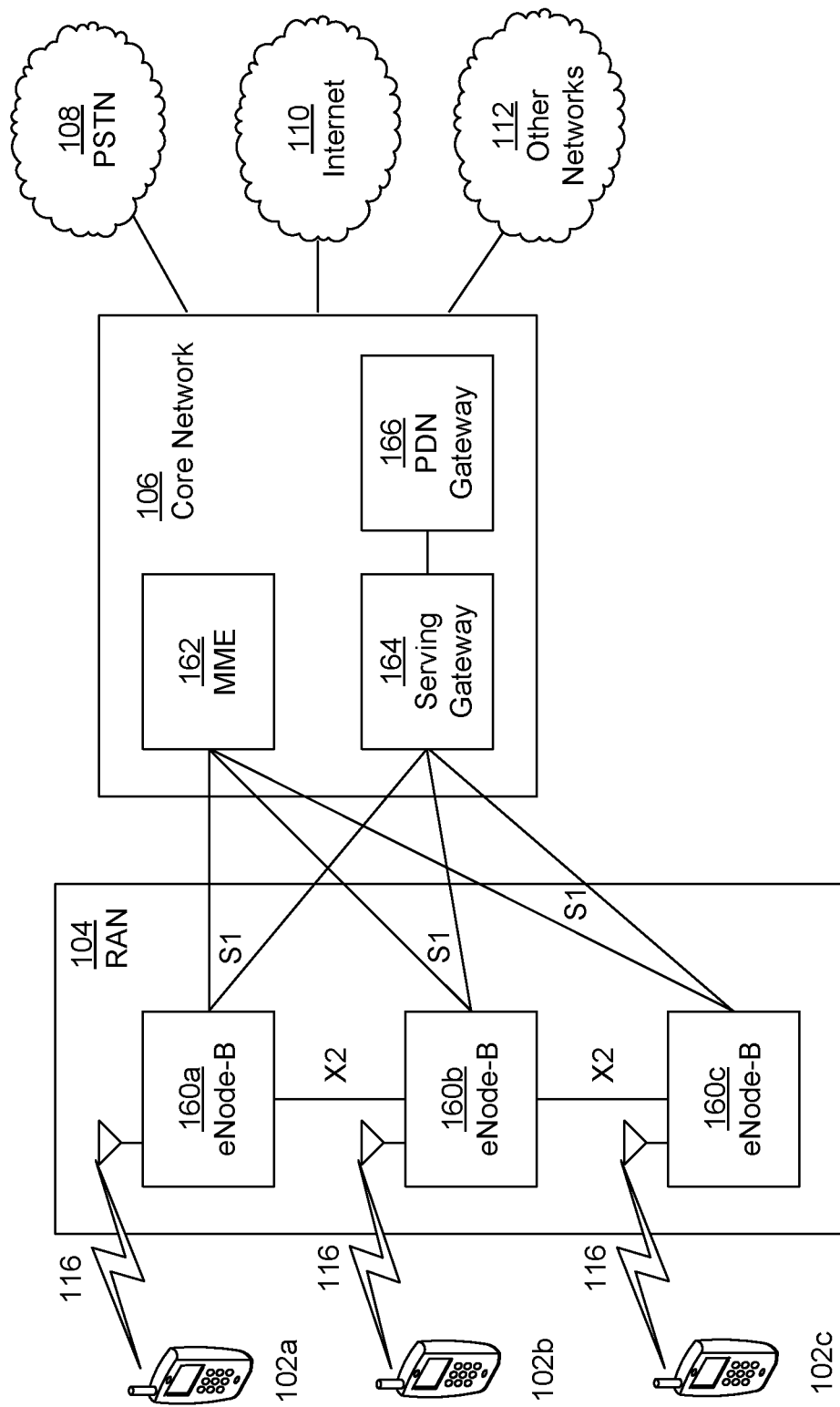
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.1 lac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams, Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
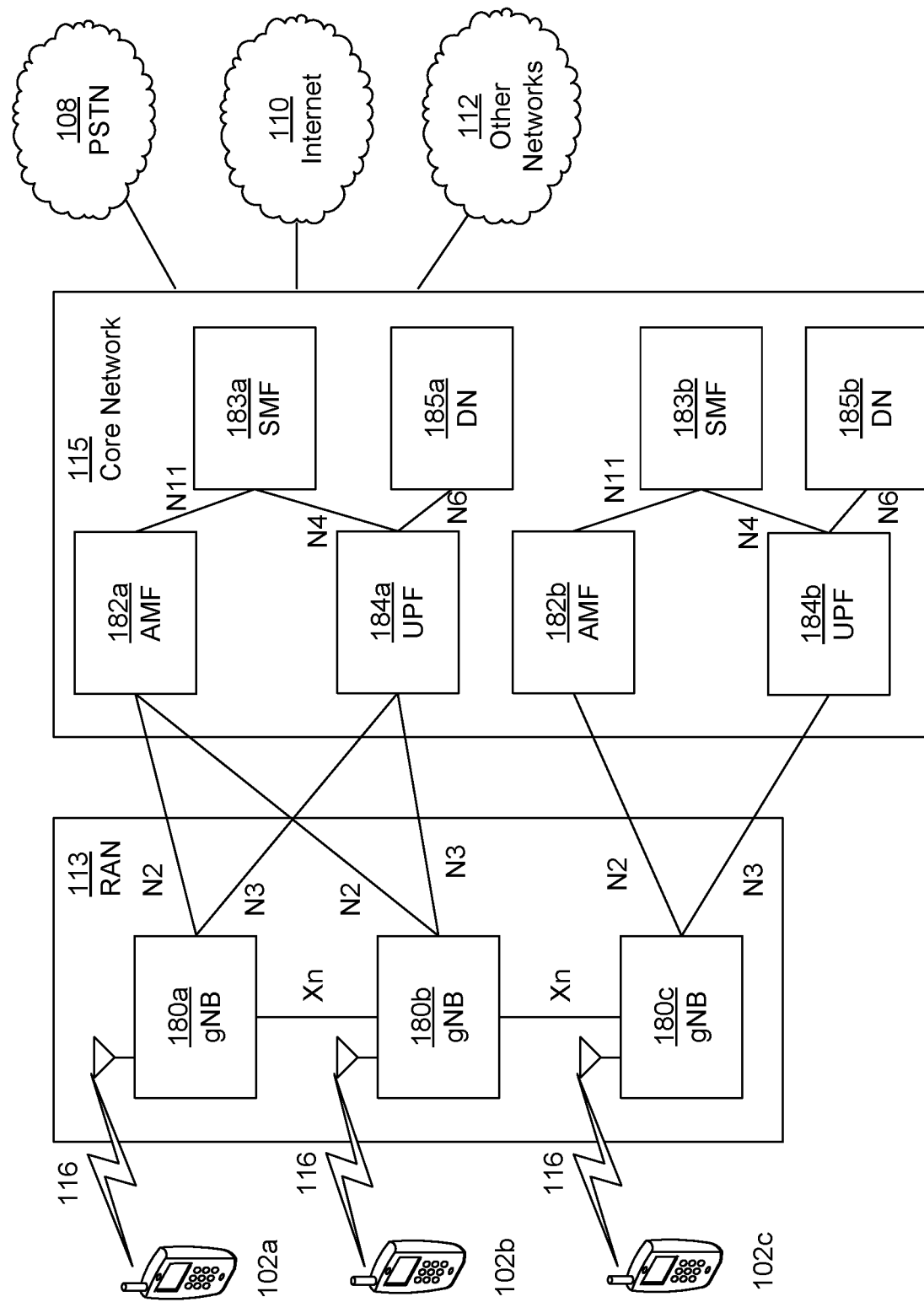
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

When referred to herein, a network may include one or more gNBs, one or more transmission/reception points (TRPs), and/or one or more nodes associated with a radio access network. When referred to herein, MR-DC (multi-radio dual connectivity) may indicate dual connectivity to an E-UTRA node and an NR node, or dual connectivity to two NR nodes.

A WTRU may be configured with multi-connectivity such as dual-connectivity. For example, a WTRU may be configured to utilize resources provided by two nodes (e.g., two network nodes). The two nodes may be connected, for example, via a non-ideal backhaul. The nodes may provide network access to the WTRU using a same RAT or using different RATs. In examples, a first network node may act as a master node (MN) that may be configured to control resources associated with one or more cells associated with a master cell group (MCG) and a second network node may act as a secondary node (SN) that may be configured to control resources associated with one or more cells associated with a secondary cell group (SCG). The MN and SN may be connected via a network interface. At least the MN may be connected to a core network. The example implementation(s) described herein may be applicable to various use cases including where the WTRU may be configured with more than one secondary cell group (e.g., possibly controlled by more than one secondary node). In an example case of dual connectivity, the WTRU may be configured to implement multiple medium access controls or MACs (e.g., via respective MAC entities). One or more MACs (e.g., MAC entities) may be associated with an MCG and one or more MACs (e.g., MAC entities) may be associated with SCG. The WTRU may be configured to receive and process a radio resource control (RRC) message such as an RRC reconfiguration message via the MCG. The RRC message (e.g., the RRC reconfiguration message) may be associated with (e.g., include information for) SCG addition, SCG change or modification, and/or SCG release.

The latency associated with an initial setup and activation of an SCG may impact the performance of multi-connectivity. There may be a delay between a first-time instance when a WTRU determines that additional radio resources are needed (e.g. for high throughput data transmission) and a second time instance when the WTRU is ready to transmit on an SCG. This delay may be associated with (e.g. caused by) aspects including the signaling delay over the Uu interface (e.g. buffer status, measurement report, etc.), signaling delay over the Xn interface (e.g. coordination between master and secondary nodes), etc.

Interruptions during a mobility procedure may impact the performance of multi-connectivity. In examples, mobility robustness may be supported at least when a SCG bearer is terminated in the SN, e.g., since an SCG change failure may introduce interruptions to ongoing data transmission. The delay from a WTRU sending a measurement report to the WTRU receiving a RRCReconfiguration may be uncertain due to inter-node coordination between a MN and a target SN. This may result in a SCG change being too late or too early. An SCG may be deployed in higher frequencies (e.g. in frequency range 2 (FR2) such as between 24.25 GHz to 52.6 GHz), where cell sizes may be small and beamforming may result in fragile links.

Mobility interaction between different connectivity legs of a multi-connected WTRU may be impacted. The WTRU may be configured to perform network-controlled mobility operations for an MCG and conditional mobility operations for an SCG. The WTRU may be configured to perform network-controlled mobility operations for an SCG and conditional mobility operations for an MCG. The WTRU may be configured to perform conditional mobility operations for both an MCG and an SCG. The WTRU's behavior may be affected by (e.g. may be inconsistent because of) implications (e.g. success/failure) of concurrent mobility procedures performed on different layers in a multi-connectivity scenario.

A WTRU may be configured to perform mobility related operations in a multi-connectivity scenario. The description provided herein relating to a conditional handover (CHO) may be at least partially applicable to a conditional reconfiguration, and vice versa. Similarly, the description relating to a conditional PSCell addition and/or change (CPAC) may be at least partially applicable to a conditional PS cell change (CPC), and vice versa. Examples of CPAC may include performing a reconfiguration associated with a secondary cell group if a preconfigured execution condition or trigger is satisfied. Such an execution condition and/or trigger may be preconfigured, for example, by a network entity via higher layer signaling. Examples provided herein with reference to a master node (MN) may be at least partially applicable to a master cell group (MCG), and vice versa. Examples provided herein with reference to a secondary node (SN) may be at least partially applicable to a secondary cell group (SCG), and vice versa.

A WTRU may apply a configuration associated with a secondary cell group as a function of a condition (e.g., based on a preconfigured condition). A WTRU may be configured to perform a cell group configuration or reconfiguration for a secondary cell group if a preconfigured condition is satisfied. The secondary cell group may correspond to (e.g. use) the same RAT as a master cell group or the second cell group may use a different RAT than the RAT used by the master cell group (e.g., the second cell group may be a multi-radio secondary cell group). The secondary cell group configuration or reconfiguration may be synchronous (e.g., include a preamble transmission that may be configured using a configuration parameter such as reconfigurationWithSync). The cell group configuration or reconfiguration may be signaled as a part of an RRC reconfiguration message.

A WTRU may be configured with (e.g., the WTRU may receive) one or more multi-connectivity conditional reconfigurations, e.g., where at least one reconfiguration may be associated with an MCG and at least one reconfiguration may be associated with an SCG. A WTRU may be configured with a plurality of conditional reconfigurations where a first subset of the conditional reconfigurations may be associated with a master cell group and a second subset of (e.g., the remaining) the conditional reconfigurations may be associated with a secondary cell group. A WTRU may be configured with a plurality of conditional reconfigurations where the plurality of conditional reconfigurations may correspond to a master cell group and a secondary cell group. The WTRU may apply an MCG reconfiguration and/or an SCG reconfiguration if a trigger condition (e.g., a trigger condition associated with a conditional reconfiguration) is satisfied. A WTRU may be configured with a plurality of conditional reconfigurations where one or more conditional reconfigurations associated with a secondary cell group may be linked to a conditional reconfiguration of a master cell group. The WTRU may apply a conditional reconfiguration associated with the master cell group if a first trigger condition is satisfied. The WTRU may apply the conditional reconfiguration associated with the secondary cell group that is linked to a currently activated master cell group if a second trigger condition is satisfied.

Configuration aspects associated with conditional secondary cell group configuration or reconfiguration may be described herein. A WTRU may be configured to apply an SCG configuration if a preconfigured condition is satisfied. The SCG configuration may include one or more of the following: a configuration of a special cell (e.g. such as an spCellConfig), which may include PSCell configuration information; a configuration to perform reconfiguration with sync; a radio bearer configuration that may include packet data convergence protocol (PDCP) configuration information, radio link control (RLC) configuration information, and/or logical channel configuration information; a MAC configuration (e.g. configuration information for a MAC entity associated with the cell group); or a configuration associated with zero or more SCells to be added, modified, and/or released.

A WTRU may be configured with a linkage (e.g. a mapping, an association, a relationship, etc.) between an SCG configuration and a trigger condition. One SCG configuration may be associated with multiple trigger conditions. Multiple SCG configurations may be associated with a single trigger condition. A WTRU may be configured to determine which one or more conditional SCG configurations may be applicable for a given MCG configuration. The WTRU may use such a determination to perform monitoring associated with one or more SCG configurations. For example, the WTRU may be configured to monitor trigger conditions associated with those SCG configurations that are linked to a currently active MCG configuration. A WTRU may be configured with a linkage between MCG candidates and SCG candidates. In examples, a WTRU may be configured with a linkage between candidates for conditional handover (CHO) (e.g., on an MCG) and candidates for a conditional SCG reconfiguration. Such linkage may, for example, be used to exploit certain network (NW) preferences and/or limitations as to the combination of an MN and an SN that the WTRU can connect to. The behavior of a WTRU may be impacted by a linkage as described herein. A linkage may imply or control the WTRU's behavior, for example, with respect to a CHO and/or a PSCell change.

A WTRU may trigger a conditional SCG reconfiguration as a result of executing a CHO. In examples, a WTRU may be configured to trigger a conditional SCG reconfiguration at or following a CHO. The conditional SCG reconfiguration may be triggered due to a lack of a linkage between a CHO target and the current PSCell or SCG configuration. In examples, a WTRU may be configured with an SCG configuration corresponding to a CHO candidate (e.g., a candidate master node). A WTRU may trigger a PSCell configuration based on the triggering of a CHO. The WTRU may be configured with a number of conditions (e.g., as described herein) on which to perform a SCG reconfiguration following a CHO. For example, if one or more of the conditions are met, the WTRU may perform a PSCell change to a linked configuration and if none of the conditions are met, the WTRU may release or suspend the SCG configuration, or maintain the current configuration.

A WTRU may trigger a CHO as a result of a conditional SCG reconfiguration. For example, a WTRU may be configured to trigger a CHO at or following a conditional PSCell change being triggered. One or more aspects of the examples described above (e.g., for performing a conditional SCG reconfiguration as a result of a CHO execution) may apply to performing a CHO as a result of a conditional SCG reconfiguration. For instance, the WTRU may be configured with a number of conditions (e.g., as described herein) on which to perform a CHO following an SCG reconfiguration. If one or more of the conditions are met, the WTRU may perform a CHO and if none of the conditions are met, the WTRU may release or suspend a CHO.

A WTRU may decide to suspend, release, or maintain active a currently active SCG configuration following a CHO based on certain condition(s) related to a linkage. For example, a WTRU may perform CHO to a target and may decide to activate, suspend, or release a current SCG configuration depending on a linkage of the SCG configuration with the target. For example, if the WTRU is configured with a linkage between the CHO and the current SCG, it may continue operation on the SCG. If the WTRU is not configured with a linkage between the CHO and the current SCG, the WTRU may suspend the SCG, release the SCG, activate a different SCG, or perform reconfiguration to a different SCG.

A WTRU may suspend or release certain bearers (e.g., a data radio bearer (DRB) and/or a signaling radio bearer (SRB)) based on one or more conditions related to a linkage. For example, a WTRU may suspend or release a DRB during a CHO or conditional PSCell change if a linkage does not exist between the CHO candidate and the current SCG, or between the PSCell candidate and the current PCell. The WTRU may be configured with a list of bearers to be suspended and/or released if a linkage described herein exists. The WTRU may be configured with a list of bearers to be suspended and/or released if a linkage described herein does not exist.

A WTRU may perform a radio bearer reconfiguration (e.g. from a split bearer to an MCG/SCG bearer) based on certain condition(s) related to a linkage described herein. For example, a WTRU may perform radio bearer reconfiguration in the event where a linkage does not exist. For example, if a linkage does not exist between a CHO target and the current PSCell, the WTRU may reconfigure one or more split bearers (e.g., all split bearers) to MCG bearers or SCG bearers.

A WTRU may decide to reconfigure portions of the SCG configuration following a CHO based on certain condition(s) related to a linkage described herein. For example, the WTRU may be provided with a reconfiguration of the SCG. The WTRU may apply such reconfiguration on a condition (e.g., only on the condition) that the CHO target is not linked to the current active SCG configuration. The WTRU may not apply such reconfiguration if a linkage (e.g. between the CHO target and the current active SCG configuration) exists.

A WTRU may consider a subset of configured conditional PSCell candidates (e.g., only a subset of the configured conditional PSCell candidates) that the WTRU is allowed to access to perform a conditional PSCell change based on a given active PCell or MCG configuration. For example, following selection of a CHO candidate, a WTRU may select a subset of the corresponding PSCell candidates (e.g., only a subset of the corresponding PSCell candidates) that the WTRU is allowed to use in case PSCell reconfiguration is triggered along with or as a result of a CHO.

A WTRU may consider a subset of configured conditional handover (HO) (e.g., PCell) candidates (e.g., only a subset of the configured conditional HO (PCell) candidates) that the WTRU is allowed to access to perform conditional HO based on a given active PSCell or SCG configuration. This behavior of the WTRU may also apply when a conditional PSCell configuration triggers a CHO (e.g., after or during the conditional PSCell configuration).

A WTRU may apply a bias in the trigger condition for a conditional HO to a PCell, for example, depending on the existence of a linkage between the current PSCell and the CHO candidate (e.g., the WTRU may prioritize candidates with a linkage over candidates without a linkage). For example, a WTRU may be configured with a trigger condition for a conditional HO candidate based on a measurement. The WTRU may be further configured with a bias in such a measurement or with a different measurement depending on whether there is a linkage between the CHO candidate and the current PSCell. The WTRU may apply a bias in the trigger condition for a conditional PSCell change depending on the existence of a linkage of the current PCell with the conditional PSCell candidate. This behavior of the WTRU may also apply in the case of conditional PSCell configuration. The WTRU may decide to select one or more candidates with priority (e.g., if multiple candidates exist and a CHO or conditional PSCell change is triggered) depending on the existence of a linkage of the current PCell/PSCell with the conditional PCell/PSCell candidate in question.

A WTRU may receive signaling and/or identification of a linkage, for example, from higher layers. The WTRU may receive explicit signaling of such linkage during MCG and/or SCG conditional HO execution. Such explicit signaling may be in one or more of the following forms. The WTRU may receive, for each PCell CHO candidate, a list of allowed or linked PSCells and/or applicable SCG configuration(s) if a CHO is performed to a candidate (e.g., to each candidate). The WTRU may receive, for example, for a PSCell candidate (e.g., for each PSCell candidate), a list of allowed or linked PCells and/or applicable MCG configuration(s) if conditional SCG reconfiguration is performed. The WTRU may receive an identifier with a cell configuration (e.g., with each cell configuration). The WTRU may assume a linkage between an MCG and an SCG, e.g., if they have the same identifier or related identifiers. The WTRU may receive a table of linked PCells and/or PSCells (e.g., such as a table of cell IDs), for example, via dedicated configuration information or via a SIB. The WTRU may be configured with plurality of conditions to trigger a reconfiguration. For example, a first condition may be applied if there is a linkage between a candidate cell associated with the reconfiguration and a serving cell (e.g., a serving cell associated with the MCG and/or the SCG), and a second condition may be applied if there is no linkage between a candidate cell associated with the reconfiguration and a serving cell (e.g., a serving cell associated with the MCG and/or the SCG).

A WTRU may determine a linkage implicitly based on one or more of the following. The WTRU may determine such a linkage implicitly based on a relationship between parameters associated with each configuration. The WTRU may consider the cells to be linked if they have the same security parameter for the cells or if there is some relation between a security parameter for the cells. In examples, the WTRU may consider the cells to be linked if there is some direct relation in the cell ID. In examples, the WTRU may consider the cells to be linked if they have the same configuration for a specific bearer (e.g. a split bearer). The WTRU may consider an SCG to be linked to an MCG, for example, if the SCG and MCG are included (e.g., are configured) in a same RRC Reconfiguration message. Linkage may be explicit or implied, for example, by inclusion of a masterCellGroup configuration and a secondaryCellGroup configuration in an RRCReconfiguration message.

A linkage between MCG candidates and SCG candidates may be dependent on a specific trigger condition. The linkage between MCG candidates and SCG candidates may depend on a specific trigger for CHO and/or conditional PSCell change. A WTRU may be configured with a first set of one or more triggers based on an assumption that a first linkage or set of linkages exist and the WTRU may be configured with a second (e.g., separate) set of one or more triggers based on an assumption that a second linkage or set of linkages exist. In examples, a WTRU may be configured with conditional PSCell candidates 1 and 2. Conditional PSCell candidate 1 may have a linkage to the current PCell and conditional PSCell candidate 2 may have no linkage to the current PCell. Such a linkage may be applicable to the trigger (e.g., only the trigger) of data arrival on an SCG bearer, but not to the trigger of SCG cell quality. For example, if the WTRU triggers conditional PSCell change due to data arrival while camped on the current PCell, the WTRU may prioritize or limit PSCell change to PSCell candidate 1 (e.g., and not to PSCell candidate 2). If the WTRU triggers conditional PSCell change due to SCG cell quality, the WTRU may allow PSCell change to PSCell candidate 1 or PSCell candidate 2 without prioritizing either of the candidates.

A WTRU may receive a generic cell group configuration which may be used as an MCG or SCG configuration. A WTRU may receive one or more conditions associated with application of the CG configuration as an MCG configuration or an SCG configuration. In examples, a WTRU may be configured with a first set of one or more conditions whereby a generic cell group configuration may be applied as an MCG configuration, and a second set (e.g., potentially different from the first set) of one or more conditions whereby the generic cell group configuration may be applied as an SCG configuration. In examples, a WTRU may receive a generic cell group configuration that may be used for a conditional PSCell addition and/or a conditional PSCell change. For instance, if the condition for a conditional PSCell addition and/or a conditional PSCell change is satisfied and the WTRU does not have an active SCG configuration, the WTRU may perform the conditional PSCell addition. If the condition for the conditional PSCell addition and/or the conditional PSCell change is satisfied and the WTRU has an active SCG configuration, the WTRU may perform the conditional PSCell change. The examples described herein may be applicable if a generic cell group is configured for conditional PSCell additions and conditional PSCell changes.

A WTRU may identify a generic CG if the WTRU is also configured with other non-generic CG candidates. For example, a WTRU may be configured with one or more generic CG configurations in addition to MCG-specific or SCG-specific configurations. The WTRU may identify the generic CG configurations based on explicit signaling (e.g., based on respective identities or identifiers included in the generic CG configurations, or based on the use of separate information elements (IEs) for the generic CG configurations). A WTRU may identify a generic configuration based on having been provided with a full (e.g., rather than delta) configuration for the generic CG configuration.

A CG configuration may be provided as delta signaling (e.g., in addition to other signaling). A WTRU may receive a generic CG configuration as delta signaling and may apply the delta signaling to derive a resulting MCG or SCG configuration. In the case where separate delta configurations are provided for the MCG and the SCG, one or more of the following may apply. A CG configuration may be provided in separate parts, e.g., a delta configuration associated with an MCG and a delta configuration associated with an SCG. In examples, if the WTRU decides to apply conditional CG configuration to the SCG, the WTRU may apply the delta configuration associated with the SCG to the current SCG configuration (e.g., while ignoring the delta configuration associated with the MCG). In examples, the WTRU may apply both the MCG and the SCG delta configurations regardless of which CG is being changed.

In the case where a CG configuration is provided as delta signaling to the MCG or SCG, one or more of the following may apply. The CG configuration may be provided as a delta configuration to a currently configured CG (e.g., the MCG or SCG). If the CG configuration is provided with respect to the MCG and if a CHO is performed on the PCell, the WTRU may apply the delta configuration to its current MCG configuration (e.g., to derive an MCG configuration after the CHO). If the CG configuration is provided with respect to the MCG and if a conditional PSCell change is performed, the WTRU may apply the delta configuration to its current MCG configuration (e.g., to derive a SCG configuration after the conditional PSCell change). If the CG configuration is provided as a delta configuration with respect to the SCG and if a conditional PSCell change is performed, the WTRU may apply the delta configuration to its current SCG configuration (e.g., to derive a SCG configuration after the conditional PSCell change). The WTRU may receive signaling (e.g., in the candidate configuration itself) regarding whether the delta configuration is to be applied with respect to the MCG or the SCG.

A WTRU may be configured with one or more trigger conditions for a secondary cell group configuration or reconfiguration. The WTRU may be configured to apply a reconfiguration associated with a secondary cell group if one or a combination of the trigger conditions described herein are satisfied. For example, the WTRU may be configured to apply a SCG reconfiguration if a measurement-based condition is satisfied. The measurement-based condition may correspond to cell quality measurement like RSRP, RSRQ, or SINR. The measurement-based condition may be configured as a measurement event (e.g., Ax, Bx or the like), for example, with one or more appropriate thresholds. The WTRU may apply a SCG reconfiguration if the measurement-based condition and one or more of the following triggering conditions are satisfied.

A trigger condition may be associated with a user plane status. A WTRU may be configured to apply an SCG configuration, for example, if a measurement-based condition and a user plane-based condition is satisfied. For example, the user plane condition may be satisfied if one or more of the following occur. The user plane condition may be satisfied based on data associated with a preconfigured logical channel (LCH) or logical channel group (LCG) (e.g., such an LCH/LCG may correspond to a SCG bearer or a split bearer) becoming available for transmission. The user plane condition may be satisfied if the buffer status for one or multiple bearers reaches a threshold (e.g., the threshold may correspond to a data split threshold, or may be derived from the data split threshold for multiple bearers). For example, the user plane condition may be satisfied if a WTRU determines that the amount of pending PDCP and RLC data on all split bearers is above a threshold, which may trigger application of an SCG configuration or activate the SCG. The user plane condition may be satisfied if the latency associated with data transmission becomes higher than a preconfigured threshold. The user plane condition may be satisfied if the latency associated with a scheduling request becomes higher than a preconfigured threshold. The user plane condition may be satisfied if the number of RLC retransmissions becomes greater than a preconfigured threshold. The user plane condition may be satisfied if one or more conditions of a buffer status in relation to a time aspect are satisfied. For example, whether the user plane condition may be satisfied may be determined based on the amount of time over which a buffer status (e.g. for one or a subset of bearers exceeds a threshold (e.g. the trigger may be the amount of time a threshold is exceeded). The user plane condition may be satisfied if the amount of increase in the buffer status (e.g. over a unit of time) is larger than a threshold. The user plane condition may be satisfied if a buffer status report (BSR) is triggered or transmitted (e.g. the trigger of the BSR may be associated with the presence of another condition, such as the buffer status for one or more split bearers being above a threshold).

In examples, a WTRU may be configured with two thresholds for a split bearer (e.g., for each split bearer. The WTRU may activate or apply an SCG configuration, for example, if the PDCP and RLC data pending for a (e.g., any) bearer is above a first threshold. With the SCG configuration activated or applied, the WTRU may continue to submit data to (e.g. only to) the MCG leg of the split bearer. The WTRU may submit data to the SCG leg of the split bearer, for example, if the PDCP/RLC data pending for a bearer is above a second threshold. The WTRU may follow similar rules for deactivation.

A trigger condition may be associated with SRB3. A WTRU may be configured to apply an SCG configuration if the WTRU is unable to comply with a RRCReconfiguration message received over SRB3, e.g., possibly if the PSCell associated with a stored SCG configuration meets a measurement and/or suitability criterion.

A trigger condition may be associated with SCG failure. A WTRU may be configured to apply a SCG configuration if a SCG failure is detected. The SCG configuration may correspond to an SN change. The SCG failure may be detected if one or more of the following conditions are met. The SCG failure may be detected in response to detecting a radio link failure for the SCG. The SCG failure may be detected in response to detecting a reconfiguration with sync failure of the SCG. The SCG failure may be detected in response to detecting a SCG configuration failure. The SCG failure may be detected in response to receiving an integrity check failure indication from a SCG lower layer concerning SRB3.

A trigger condition may be associated with a beam failure (e.g. for the PSCell of a SCG). A WTRU may be configured to apply an SCG configuration and/or to activate a dormant SCG (e.g. as described herein) if a beam failure is detected on the PSCell. In the case of a suspended and/or dormant SCG or a dormant SCell (e.g. a cell operating on a secondary frequency to provide additional radio resources for a WTRU configured with CA), the WTRU may continue to perform beam monitoring on the cell. In the case of beam failure, the WTRU may initiate a beam failure recovery procedure and/or activate the dormant SCG, PSCell, and/or SCell (e.g. in order to receive a random access channel (RACH) response on a physical downlink control channel (PDCCH) for the beam failure recovery procedure).

A trigger condition may be associated with an MCG radio link status. A WTRU may be configured to apply an SCG configuration as a function of a radio link status associated with the MCG. For example, the WTRU may be configured to apply an SCG configuration if an RLF is detected in the MCG. In examples, the WTRU may be configured to execute an RRC implementation based on a stored SCG if there is an MCG RLF. One or more of the following may apply. For the case of an MCG RLF, if the WTRU has a stored a configuration for a SCG and if the PSCell associated with the SCG meets a suitability criterion and if SRB3 or split SRB1 is configured for the SCG, then WTRU may apply the stored SCG configuration and/or transmit an MCG failure message to the SCG (e.g., indicating the reason for the MCG failure and the trigger for applying the SCG configuration such as an MCG RLF). For the case of an MCG RLF, the WTRU may initiate a re-establishment. As part of the re-establishment, the WTRU may perform cell selection. If the selected cell is the same as the PSCell associated with the SCG configuration, the WTRU may apply the stored SCG configuration and/or transmit an MCG failure message to the SCG, for example, to indicate the reason for the MCG failure and the trigger for applying the SCG configuration such as an MCG RLF. For the case of an MCG RLF, if the WTRU is configured with a generic cell group configuration, the WTRU may promote the cell group configuration to an MCG configuration and may perform a conditional handover towards the promoted MCG configuration.

A trigger condition may be associated with the execution of an MCG conditional reconfiguration. A WTRU may be configured to apply an SCG configuration if a conditional reconfiguration associated with an MCG is executed successfully. A WTRU may be configured to perform a conditional SCG configuration following a conditional MCG configuration, e.g., if there is satisfaction of one or more additional triggered conditions described herein. A WTRU may be configured to release an SCG configuration if a conditional reconfiguration is applied towards an MCG and the current SCG configuration is not linked to such MCG.

There may be interaction (e.g. information exchange) between a monitoring procedure for a conditional MCG reconfiguration and a monitoring procedure for a conditional SCG reconfiguration. A WTRU may be configured to concurrently monitor trigger conditions associated with a conditional SCG reconfiguration and trigger conditions associated with a conditional MCG reconfiguration. The WTRU may be configured to start monitoring one or more trigger conditions associated with one or more SCG reconfigurations, where those SCG reconfigurations may be linked to an MCG configuration that may be active or for which a trigger condition may be satisfied.

If trigger conditions for an MCG (re)configuration and/or an SCG (re)configuration are satisfied (e.g., simultaneously), a WTRU may be configured to prioritize an MCG reconfiguration. After the MCG reconfiguration, if the stored SCG is linked to the serving MCG, the WTRU may apply the SCG reconfiguration; if the stored SCG is not linked to the serving MCG, the WTRU may release the SCG configuration. If trigger conditions for MCG and SCG (re) configurations are satisfied (e.g., simultaneously), the WTRU may be configured with rules to determine which (re)configuration(s) to prioritize. For example, rules for the prioritization may be based on the relative cell quality of the MCG and the SCG.

If the trigger condition associated with an MCG is satisfied while a conditional SCG reconfiguration is ongoing, the WTRU may be configured with the following behavior. The WTRU may be configured to release an SCG reconfiguration and trigger an MCG reconfiguration. This behavior may be limited to situations where the SCG reconfiguration is not linked to the MCG reconfiguration. The WTRU may be configured to continue the MCG and SCG reconfiguration. The WTRU may be configured to indicate to the MCG about the SCG reconfiguration.

If the trigger condition associated with an SCG is satisfied while a conditional MCG reconfiguration is ongoing, the WTRU may be configured with the following behavior. The WTRU may be configured to postpone the SCG reconfiguration, for example, until the MCG reconfiguration is completed or until the MCG reconfiguration fails. The WTRU may (e.g., in case of MCG reconfiguration success) indicate to the MCG that an SCG reconfiguration is triggered. The WTRU may (e.g., in the case of MCG failure) report an MCG failure to the SCG.

A WTRU may be configured to handle a SCG state based on a condition. For example, the WTRU may be configured to activate (or deactivate) an SCG (e.g., an SCG configuration) based on one or more preconfigured triggers. For example, the WTRU may be configured with one or more SCG configurations that may be dormant and the WTRU may be further configured with one or more configurations or conditions for activating a SCG configuration (e.g., move the SCG configuration from a dormant state to an activated state) or suspending a SCG configuration (e.g., move the SCG configuration from an activated state to a dormant state). A dormant state may be characterized by one or more conditions such as those associated with a dormant SCell in which a WTRU may perform channel quality indicator (CQI)/radio resource management (RRM) measurements but may not decode a PDCCH. In examples, have a SCG configuration in a dormant state may mean storing the SCG configuration at the WTRU, but not applying it. A WTRU may apply any of the triggers described herein (e.g., in relation to conditional PSCell change or addition) to activating an SCG. A WTRU may operate with multiple activated SCGs if the triggers for activation of these SCGs are satisfied without satisfying the trigger for deactivation of the SCGs.

Given a plurality of SCG configurations, a WTRU may select an SCG for activation. For example, a WTRU may be configured with a plurality of dormant SCG configurations and each of the SCG configurations may include a PSCell and zero or more SCells. The WTRU may select an SCG for activation based on preconfigured criteria. The WTRU may select the SCG that has the best PSCell or SCell (e.g., based on RRM measurements). The WTRU may select the SCG that has the best PSCell or SCell based on channel state information (CSI) measurements. The WTRU may select the SCG that is configured with a dedicated RACH resource. The WTRU may select the SCG with the highest number of beams above a threshold. The WTRU may select the SCG with the highest number of SCells meeting a minimum RSRP, RSRQ, SINR, and/or CSI threshold. The WTRU may select the last active SCG.

A WTRU may be configured to indicate an SCG activation to the network based on activation of the SCG. The WTRU may transmit a scheduling request to the selected SCG (e.g., if a valid scheduling request (SR) resource is configured and/or if UL time alignment is valid). The WTRU may provide the activation indication using any of the mechanisms described herein for indication of an acceptable SCG.

A WTRU may provide an indication to a dormant SCG, for example, based on an action on an MCG. A WTRU may be configured to perform one or more actions to a dormant SCG based on one or more of the triggers discussed herein (e.g., prior to or as part of the activation of the dormant SCG). The actions may be performed in a predefined order. The actions may include, for example, one or more of the following. The actions may include transmitting an SR to the SCG. The actions may include transmitting a RACH message (e.g., a RACH preamble) to the SCG. The actions may include transmitting a CSI reference signal (CSI-RS) report and/or beam measurement to the SCG. The actions may include initiating transmission of SRS. The actions may include initiating a beam management procedure on the SCG. The actions may include changing a beam management behavior or configuration with the SCG (e.g., changing from wide beams to narrow beams, varying the number of beams being monitored/reported, etc.). The actions may include initiating PDCCH monitoring on the SCG. For example, the WTRU may start normal PDCCH monitoring following a transmission. The WTRU may perform PDCCH monitoring for a response, and may continue such monitoring after reception of the response, for example, if the response is positive (e.g., indicating SCG activation).

Activation of an SCG may be signaled by the network (e.g., via RRC signaling or MAC control element (CE) by the MCG). Activation of an SCG may be characterized at the WTRU, for example, by active PDCCH monitoring on the SCG. The WTRU may (e.g., prior to such activation) be configured with a trigger that initiates an action (e.g., one or more of the actions described herein) prior to reception of an activation message.

A WTRU may be configured with a dedicated RACH configuration and/or an SR configuration to send an indication to an SCG. A WTRU may be configured with a dedicated RACH configuration and/or a dedicated SR configuration to perform access to a dormant SCG. A WTRU may perform a RACH procedure or send an SR to a dormant SCG based on one or more of the following. The WTRU may perform a RACH procedure or send an SR to the dormant SCG based on a timing advance timer (TAT) associated with the MCG and/or SCG (e.g., the WTRU may perform the RACH if a TAT expires at the SCG). The WTRU may perform a RACH procedure or send an SR to the dormant SCG based on the WTRU's configuration regarding random access and/or scheduling requests. For example, the WTRU may perform a RACH procedure if the WTRU is not configured with SR resources or the WTRU may perform a RACH procedure if the WTRU is configured with dedicated RACH resources. When referred to herein, performing a RACH or a RACH procedure may include transmitting and/or receiving random access related messages such as a random access preamble, a random access request, a random access response, etc.

A WTRU may trigger a BSR to the MCG and trigger random access and/or a scheduling request to the SCG, for example, if the amount of PDCP or RLC data at one or more split bearers (e.g., at all split bearers) exceeds a threshold. The WTRU may initiate the transmission of an SR or a RACH request to the SCG, for example, if the WTRU triggers a BSR transmission (e.g., to the MCG). A trigger of the SR or RACH to the SCG may be conditioned on the available data on one or more split bearers (e.g., on all split bearers), for example, if a BSR is triggered. The WTRU may transmit an SR or a RACH request if the available data at the WTRU on one or more split bearers (e.g., on all split bearers) exceed a threshold (e.g., at the time of a BSR). The WTRU may be configured with a BSR trigger that is associated with a trigger related to data arrival.

A WTRU may receive an indication from the network (e.g., from the MCG) to start a procedure to the SCG. The indication may be comprised, for example, in a downlink control information (DCI) message, a MAC CE, or an RRC message. The WTRU may initiate an SR or a RACH procedure to the SCG in response to receiving such a message. The WTUR may initiate a procedure to the SCG with or without the transmission of an RRC message to the SCG. For example, the WTRU may initiate a RACH procedure to the SCG without transmitting an RRC reconfiguration related message to the SCG. For example, the WTRU may perform a beam failure recovery procedure based on a trigger. The WTRU may initiate a beam management procedure based on a trigger. The WTRU may perform a sequence of one or more of the actions described herein in any order based on a trigger described herein. For example, the WTRU may (e.g., first) transmit a RACH request and (e.g., following transmission of the RACH request) start to monitor CSI-RS, start to report CSI-RS, and/or change an aspect of the CSI-RS monitoring and/or reporting.

A WTRU may initiate CSI-RS measurement and reporting to the SCG based on a trigger (e.g., one or more of the triggers described herein). A WTRU may provide an indication implicitly to the SCG, for example, by reporting CSI-RS measurements. A WTRU may maintain one or more behaviors associated with sending an indication or message to the SCG (e.g., CSI-RS measurement and/or reporting), for example, for a period of time or until reception of an activation command (e.g., by the MCG or SCG). A CSI-RS measurement/reporting configuration may be specific to a period of time between a trigger and an activation command, which may be referred to as an SCG warmup period. A WTRU may remain in SCG warmup for a finite time period, for example, before resuming WTRU procedures related to an SCG dormant state. A WTRU may, for example, start a timer based on a trigger of an indication to the SCG. A WTRU may move the SCG to an activated state and perform procedures related to the activated state (e.g., normal connected mode procedures), for example, if the WTRU receives an activation command. A WTRU may stop procedures related to an SCG warmup period, and may perform procedures related to SCG dormant state, for example, if the timer expires.

Beam management may be provided for a dormant SCG. A WTRU may select beams for which the WTRU may perform beam management for one or more dormant SCGs. The WTRU may be configured to perform beam management for a SCG in a dormant state. The WTRU may perform beam management selectively for a subset of SCGs (e.g., if multiple SCGs are configured). The WTRU may be configured to perform beam management (e.g. for at least N SCGs and/or for at least M SCells). In examples, the WTRU may be configured to perform beam management for top K PCells and SCells, e.g., whose reference signal received power (RSRP) and/or reference signal received quality (RSRQ) and/or signal to noise and interference ratio (SINR) are above a threshold. The values of N, M, and K may be preconfigured.

A WTRU may be configured to activate an SCG if a beam failure is detected for at least one SCell within that SCG. The WTRU may then perform a beam failure recovery procedure defined for the SCG. The WTRU may enter a dormant state for that SCG (e.g., based on successful beam failure recovery). A WTRU may activate a second dormant SCG (e.g., based on a beam recovery failure in a first dormant SCG). The WTRU may activate a second dormant SCG if the beam quality associated with the second SCG is above a threshold. The WTRU may select the SCG for activation based on preconfigured criteria described herein. If the beam failure recovery in a dormant SCG fails, the WTRU may report such failure to the MCG, e.g., using an SCG failure indication procedure. A WTRU may delay (e.g., may perform at a later time) a beam failure indication and/or beam failure recovery for a dormant SCG.

A WTRU that performs beam management for a dormant SCG for which beam failure is triggered may perform a beam failure indication and/or reporting to the network, e.g., followed by a beam failure recovery procedure. An indication and/or recovery procedure may be delayed until a later time or until a trigger condition is satisfied. A WTRU may maintain a beam failure state (e.g., the beam failure may remain pending) and corresponding information until a future trigger. A WTRU may act on a beam failure (e.g., provide a beam failure indication and/or perform a beam failure recovery), for example, based on (e.g., upon or subsequent to) a future trigger. The trigger described herein may include one or more of the following. The trigger may be that the WTRU receives an SCG activation message or command from the network. The trigger may be that the WTRU decides to autonomously activate the SCG (e.g., based on triggers described herein). The trigger may be that the WTRU performs a state transition (e.g., CONNECTED to INACTIVE or vice versa). The trigger may be a (e.g., any) trigger associated with data arrival at the WTRU such as data arriving at a bearer, where a bearer may be configured to trigger such action (e.g., an SCG bearer or a split bearer) or where a bearer may have specific characteristics associated with latency or similar QoS characteristics (e.g., a bearer associated with a logical channel prioritization (LCP) restriction). The trigger may be that a current buffer status at a WTRU such as a buffer status associated with one or more bearers goes above or below a threshold (e.g., ul-dataSplit-Threshold). The trigger may include an expiry of a timer. The trigger may include a mobility event at the MCG and/or SCG (e.g., a HO, conditional HO, SCG change, or conditional SCG change). The trigger may be that a measurement report is triggered based on other measurement related triggers associated with the MCG and/or SCG. For example, a WTRU may report a pending beam failure indication based on a measurement event configured at the WTRU that is related to the quality of a cell in the MCG and/or SCG, or the WTRU may report a beam failure on a dormant SCG as part of an RRM triggered measurement report associated with such event. The trigger may be that a WTRU receives a reconfiguration from the network (e.g., the WTRU receives a new beam failure recovery configuration). The trigger may be based on measurements of candidate or failed beams (e.g., a WTRU may trigger beam failure recovery actions if one or more candidate beams is measured above a threshold following a beam failure declaration).

A WTRU may configured with one or more conditions for leaving a beam failure pending. A WTRU may be configured with one or more conditions for delaying beam failure recovery. A WTRU may initiate beam failure recovery (e.g., immediately or shortly after the beam failure), which may include activating a dormant SCG, if one or more conditions associated with delaying beam failure recovery are not met. A WTRU may delay beam failure recovery, for example, if at least one of the following conditions are met. The WTRU may delay beam failure recovery based on a type or an amount of data available for transmission at the WTRU. The WTRU may delay beam failure recovery based on a network configuration. For example, the WTRU may be configured to delay beam failure recovery if the data pending for transmission at the WTRU is associated with a particular LCH, or a particular radio bearer. For example, the WTRU may be configured with a set of LCHs for which the WTRU should perform beam failure recovery (e.g., immediately after a beam failure) if data is available for transmission via a bearer. The WTRU may be configured to delay the beam failure recovery, for example, if the amount of data available for transmission at the WTRU, which may be for a subset of radio bearers, is below a threshold. As another example, the WTRU may be provided with configuration information (e.g., if the SCG is suspended) indicating when the WTRU should delay a beam failure recovery procedure and/or when the WTRU should perform beam failure recovery without a delay (e.g., immediately after a beam failure). Such configuration information may be provided explicitly (e.g., via higher layer signaling) or be implicitly determined, for example, based on a configuration of the RS if the SCG is in dormancy and/or based on a configuration of beam recovery resources (e.g., the configuration may indicate whether the WTRU is configured with beam recovery resources while the SCG is suspended or not suspended, the configuration may indicate respective beam recovery resources for the WTRU to use while the SCG is suspended and not suspended, etc.).

A WTRU may report a beam failure event in the SCG to the MCG. For example, a WTRU may report a beam failure event detected on a dormant SCG to the MCG. A beam failure indication or report provided by the WTRU may include one or more of the following. The beam failure indication or report may include reporting of a beam failure event (e.g., a failure type). The beam failure indication or report may include reporting of a beam index or an identification of the beam that failed. The beam failure indication or report may include an identification of a specific SCG configuration in which beam failure occurred (e.g. if the WTRU has multiple stored or dormant SCG configurations). The beam failure indication or report may include measurements of a failed beam, all of the candidate beams, or a subset of the candidate beams (e.g., N best candidates). The beam failure indication or report may include, for example, one or more of an RRC message (e.g., a SCGFailureIndication message or an equivalent RRC message), a MAC CE, a physical uplink control channel (PUCCH) transmission, an SR transmission or a similar uplink control information (UCI) transmission, and/or a random access preamble transmission.

A WTRU may receive a configuration (e.g., a new configuration) for a pending beam failure event. The WTRU may receive a configuration (e.g., a new configuration) for beam recovery (e.g., RACH resources and/or candidate beams) following a beam failure indication. The WTRU may receive a configuration from the MN, for example, via a RRC message, a MAC CE, and/or DCI. A WTRU may receive a configuration following transmission of a beam failure indication. A WTRU may receive a configuration (e.g., independent from transmission of a failure indication) based on one or more of the triggers discussed herein. A WTRU may (e.g., based on the reception of a configuration) apply a configuration for beam failure recovery, for example, if beam failure recovery is triggered. For example, a WTRU may store a received RACH configuration for beam failure recovery and apply the configuration at the time of a beam failure recovery trigger for the pending beam failure. A WTRU may maintain the latest received configuration for application of beam failure recovery.

A WTRU may decide whether to perform beam failure recovery actions in response to (e.g., immediately after) detecting a beam failure, or delay the beam failure recovery actions (e.g., to a later time such as until activation of a dormant SCG), for example, based on whether the WTRU receives a new configuration associated with beam failures in response to the WTRU sending a beam failure indication. In an example, a WTRU may delay beam failure recovery (e.g. until a future trigger as discussed herein occurs) if the WTRU does not receive a configuration in response to sending a beam failure report or indication.

A WTRU may have the following behavior while a beam failure recovery is pending on a dormant SCG. For example, a WTRU may detect a beam failure on a dormant SCG and leave the beam failure pending until a trigger (e.g., one or more of the triggers indicated herein) occurs. A WTRU may perform one or more of the following while a beam failure recovery is pending on a dormant SCG. The WTRU may stop (e.g., all) beam measurements on (e.g., all) beams of a dormant SCG until a later time (e.g., until triggering of beam failure recovery actions or a beam failure recovery trigger). For example, the WTRU may stop (e.g., all) beam measurements on (e.g., all) beams of a dormant SCG until activation of the SCG. The WTRU may start beam measurements following an activation procedure or during an activation procedure. The beam measurements may be facilitated by the transmission of RS signals (e.g., by the network) at the time of activation. The WTRU may initiate a beam recovery procedure after performing initial measurements following or during the activation. The WTRU may continue to perform beam measurements on a failed beam and/or candidate beams following the beam failure and while the beam failure recovery is pending. The WTRU may perform beam measurements on a failed beam and/or one or more candidate beams with a reduced frequency, intensity, or measurement period. For example, the WTRU may perform measurements based on a new RS periodicity determined for performing beam measurements, where the RS periodicity may be configured by the network prior to the beam failure or subsequent to the beam failure indication to the network.

A WTRU may cancel a pending beam failure recovery, for example, if the beam improves. For example, a WTRU may cancel a pending beam failure recovery if the failed beam measurements improve while the beam failure remains pending. A WTRU may avoid performing the beam failure recovery procedure, for example, if the trigger (e.g., a later activation) occurs. A WTRU that cancels a pending beam failure recovery may provide an indication to the network regarding the cancellation. The cancellation message may be similar to the original message that indicates the pending beam failure recovery.

The time at which a WTRU reports a beam failure, receives a configuration associated with a beam failure, or recovers a beam failure may vary based on multiple factors. For example, a WTRU may report a beam failure at or around the time of the beam failure (e.g., immediately after detection of the beam failure). The WTRU may receive a configuration associated with the beam failure following the report, and the WTRU may start beam failure recovery at a time of activation. A WTRU may report a beam failure to the network (e.g., at or around the time of the failure), receive a beam failure configuration such as a new beam failure configuration (e.g., which may provide dedicated RACH resources) at or around the time of the beam failure reporting, and perform beam failure recovery actions subsequent to the activation of the SCG in which the beam failure occurred.

A WTRU may report a beam failure at or around the time of the failure (e.g., immediately after the failure), receive a configuration associated with the beam failure at an activation of the SCG, and start beam failure recovery at the activation. For example, the WTRU may report beam failure at or around the time of the failure (e.g., immediately after the failure) to the network, receive a beam failure configuration such as a new beam failure configuration (e.g., which may provide dedicated RACH resources) with the activation, and perform beam failure recovery actions in accordance with the received configuration subsequent to activation of the SCG.

A WTRU may report a beam failure at activation of the SCG, receive a RACH configuration at the activation, and perform beam failure recovery at the activation. For example, the WTRU may detect a beam failure but delay reporting and recovery of the beam failure until activation of the SCG. The WTRU may report a beam failure indication during the activation, and may receive a corresponding configuration for beam failure recovery. The WTRU may perform beam failure recovery to the SCG, for example, subsequent to the activation and/or subsequent to receiving the configuration.

A WTRU may decide not to report a beam failure, and then receive a RACH configuration at activation of the SCG and perform beam failure recovery at the activation. For example, the WTRU may detect a beam failure and perform a recovery action at activation of the SCG. The WTRU may receive a RACH configuration at the activation (e.g., as part of the signaling for the activation procedure). The WTRU may perform beam failure recovery to the SCG based on the configuration received at or following the activation signaling.

A WTRU may not report a beam failure or receive a RACH configuration, and still perform beam failure recovery (e.g., with an original or existing RACH configuration) at activation of the SCG. For example, the WTRU may perform recovery at or subsequent to activation of the SCG (e.g., without reporting the recovery), for example, by utilizing a stored RACH configuration. Such a stored RACH configuration may have been received prior to the beam failure (e.g., if the SCG was placed in a dormant state or while the SCG was dormant).

A WTRU may report a beam failure at or around the time of the failure (e.g., immediately after the beam failure), receive, periodically, a RACH configuration after the failure (e.g., immediately after the failure), and perform beam failure recovery at activation of the SCG. For example, the WTRU may report a beam failure at or around the time of the failure (e.g., immediately after the beam failure) to the MCG. The WTRU may continue to report measurements to the network periodically (e.g., based on a configured period) while the beam failure on the SCG is pending. The WTRU may update its RACH configuration, for example, as part of the periodic reporting procedure. The WTRU may receive a configuration while the beam failure is pending. The WTRU may (e.g., upon or subsequent to activation of the SCG) perform beam failure recovery at the time of the activation with the last stored configuration.

FIG. 2 illustrates an example timing of beam failure reporting, configuration, and recovery. In the example scenario shown in FIG. 2, a WTRU may report a beam failure at or around the time of the beam failure (e.g., immediately after the beam failure), receive a configuration at activation of the SCG, and recover from the beam failure at the activation. Numbers shown in FIG. 2 may illustrate, as an example, an order in which the operations occur, but the order of occurrence or the interactions and/or interaction participants shown in the figure may be different in other examples. As shown in the example in FIG. 2, one or more of the following may be performed by a WTRU. The WTRU may receive an SCG suspension message (e.g., an RRC message) from the MN. The WTRU may suspend the SCG and may continue to perform beam measurements on one or more SCG SCells while the SCG is suspended. A beam failure may be detected (e.g., at a subsequent time) at the WTRU on a cell associated with the SCG. The WTRU may transmit a beam failure indication message to the MN. The MN may decide (e.g., at a subsequent time) to activate the failed SCG, and may send an SCG Activation RRC message (e.g., including beam failure recovery resources) to the WTRU. The WTRU may perform a beam failure recovery procedure (e.g., a RACH procedure) to the SCG (e.g., using the resources provided in the SCG Activation RRC message).

A WTRU may be configured to handle a MCG failure during a SCG dormant state. For example, the WTRU may detect the MCG failure when at least one SCG is in a dormant state. In such case, the WTRU may not declare a radio link failure (RLF), e.g., may not declare RLF immediately. The WTRU may be configured to activate the dormant SCG and on a condition of successful activation, the WTRU may transmit an MCG failure report to the SCG. The MCG failure report may be transmitted during a procedure in which the SCG activation is indicated to the network or the MCG failure report may be transmit after the procedure for SCG activation (e.g., immediately thereafter).

A WTRU may be configured to deactivate an SCG based on one or more preconfigured triggers. A WTRU may apply one or more triggers described herein (e.g., described in relation to conditional PSCell change) to the case of deactivating an SCG. For example, a trigger applicable for changing from one SCG to another SCG may be applicable to deactivating an SCG while activating a separate SCG.

A WTRU may be configured to handle a conditional SCG reconfiguration failure. There may be a trigger condition associated with a conditional SCG reconfiguration failure. For example, a WTRU may be triggered to apply a conditional SCG configuration or reconfiguration if a previous conditional SCG reconfiguration failed. The WTRU may be configured with a plurality of conditional SCG configurations and the WTRU may attempt to apply a conditional reconfiguration to a second SCG if a conditional SCG reconfiguration fails with a first SCG. In examples, the WTRU may be configured to report the failure of a conditional SCG reconfiguration to the MCG. This may be done via a SCG failure information message, e.g., if all conditional SCG reconfigurations fail, if n (e.g., n>=1) conditional SCG reconfigurations fail, or if no conditional SCG reconfiguration meets a configured trigger condition for SCG reconfiguration.

A WTRU may receive an indication or configuration of acceptable SCGs. A WTRU may be configured to determine the acceptability of a stored or received SCG configuration (e.g. based on measurements). For example, the WTRU may determine the acceptability of an SCG configuration based on measurements of any or all of the cells associated with the SCG (e.g., RSRP/RSRQ measurements of the cells being above a threshold). The WTRU may determine the acceptability of an SCG or SCG configuration based on the PSCell quality being above a threshold.

A WTRU may determine the acceptability of an SCG or SCG configuration based on a timer associated with the SCG expiring. Such a timer may indicate the last time the WTRU accessed the SCG, the last time the WTRU performed a resume procedure to enter an RRC_CONNECTED state, etc. A WTRU may determine the acceptability of a SCG or SCG configuration based on CSI measurements performed on a cell of the SCG (e.g., a PSCell of the SCG). For example, the WTRU may perform CSI measurements on the PSCell without reporting such measurements to the network. A WTRU may determine the acceptability of a SCG or SCG configuration based on beam measurements performed on the SCG. For example, the WTRU may determine whether the SCG or SCG configuration is acceptable based on whether a beam failure is detected in the PSCell of the SCG. The WTRU may perform beam failure detection on the PSCell of a dormant SCG and may activate the dormant SCG (e.g., to perform beam failure recovery).

Beam measurements performed on the SCG may or may not be related to triggers associated with conditional SCG addition and/or reconfiguration. A WTRU may indicate the acceptability of a SCG or SCG configuration to the network. The WTRU's indication of acceptability of the SCG or SCG configuration to the network may occur under one or more of the following conditions. The WTRU may indicate the acceptability of the SCG or SCG configuration to the network when the WTRU decides to activate a suspended or dormant SCG while the WTRU is in RRC_CONNECTED. The WTRU may indicate the acceptability of the SCG or SCG configuration to the network when the WTRU resumes from INACTIVE to RRC_CONNECTED with a stored SCG or with an SCG configured to the WTRU in a resume message. The WTRU may indicate the acceptability of the SCG or SCG configuration to the network when the WTRU decides to suspend an active SCG while the WTRU is in RRC_CONNECTED. The WTRU may indicate the acceptability of the SCG or SCG configuration to the network if the WTRU determines that the SCG moves from being acceptable to being unacceptable or vice versa (e.g., if the WTRU detects a beam failure on the PSCell).

A WTRU may trigger an RRC failure message transmission to the MCG based on a determination of an unacceptable SCG or SCG configuration. A WTRU may send an RRC failure message (e.g., SCGFailureIndication) to the MCG if a stored and/or configured SCG is not acceptable (e.g., a SCGFailureIndication message may be triggered based on measurements of the stored/configured SCG). A WTRU (e.g., during transition from INACTIVE to CONNECTED) may be indicated by the network to resume a stored SCG configuration (e.g., in a resume message or command to the WTRU). The WTRU may compare the measurements of the PSCell associated with the stored SCG configuration (e.g., collected during INACTIVE) and may transmit an SCG failure (e.g., SCGFailureIndication) or another RRC error message to the MCG if the PSCell quality is below a threshold. Error message transmission may be performed prior to transmission of a random access channel (RACH) request to the SCG or prior to the WTRU attempting to access the SCG. The WTRU may be configured with an SCG configuration in a resume message from the network during the WTRU's transition to RRC_CONNECTED. The WTRU may determine whether measurements of the PSCell of the SCG is above a threshold (prior to accessing the SCG). The WTRU may send an RRC error message following or along with an RRC complete message indicating the WTRU's transition to RRC_CONNECTED (e.g., if the measurements of the PSCell of the SCG are not above a threshold). A WTRU may be configured with a dormant SCG and/or a suspended SCG. The WTRU may trigger activation of the dormant and/or suspended SCG based on certain triggers (e.g., data related triggers) and may send an RRC failure message to the MCG or to another SCG if the WTRU determines that the SCG or one of the SCGs that were previously dormant and/or suspended is determined to be unacceptable.

A WTRU may perform random access to an SCG if the SCG is acceptable. The WTRU may indicate whether the SCG is acceptable via one or more random access messages to the SCG. The WTRU may perform random access to the SCG if the SCG is acceptable and the WTRU may not perform random access to the SCG if the SCG is not acceptable. A WTRU may be configured with an SCG and the configuration may be stored while the WTRU is in an INACTIVE state. The WTRU may receive a resume message with an indication from the network to resume the stored SCG. The WTRU may evaluate whether the SCG is acceptable and if the SCG is acceptable, the WTRU may initiate the random access to the PSCell of the stored SCG. The WTRU may abstain from performing a RACH procedure if the SCG is determined to be not acceptable by the WTRU. If the WTRU determines that the SCG is unacceptable, the WTRU may maintain the SCG configuration in a dormant or suspended state until the WTRU is reconfigured with a new SCG. The WTRU may then release the stored configuration. A WTRU may be configured with an SCG in a resume message that the WTRU may access when in RRC_CONNECTED and the WTRU may determine whether the SCG is acceptable. The WTRU may perform random access to the configured SCG if the SCG is determined to be acceptable. The WTRU may abstain from performing random access to the configured SCG if the SCG is not acceptable. The WTRU may perform contention-free or contention-based random access depending on whether the SCG is acceptable. For example, the WTRU may perform contention-free random access if the SCG is acceptable and perform contention-based random access if the SCG is not acceptable.

A WTRU may access a SCG (e.g., perform one or more access operations such as random access operations to the SCG) prior to initiating a resume procedure to an MCG. In examples, the WTRU may be configured to perform access operations to SCG (e.g., based on a stored SCG configuration) during transition from INACTIVE to RRC_CONNECTED. The WTRU may perform the access operations prior to initiating a resume procedure to an MCG, during a resume procedure to the MCG (e.g., as part of the resume procedure to the MCG), or prior to completion of the resume procedure.

Accessing a SCG prior to a resume procedure to an MCG may include one or more of performing a RACH procedure to the SCG, transmitting an RRC message or data PDU to the SCG, performing a beam failure recovery procedure to the SCG, and/or transmitting an uplink control signal (e.g., SR, PUCCH) to the SCG. The access procedure to the SCG may include one or more other operations or procedures described herein with respect to a dormant SCG.

A WTRU may determine whether it is allowed to access an SCG prior to a resume procedure to an MCG (e.g., prior to transmitting a resume request or initiating a resume operation) according to one or more of the following conditions. The WTRU may determine whether it is allowed to access an SCG based on a condition related to the time criticality of data arriving at the WTRU. For example, a RACH procedure to the SCG prior to a resume procedure or completion of a resume procedure may be allowed if data at the WTRU is to be transmitted on an LCH that is preconfigured (e.g., via LCP restrictions or a specific L1 profile) to allow the RACH procedure (e.g., according to time criticality of the LCH). The WTRU may determine whether it is allowed to access an SCG based on a condition related to the bearer type associated with data arriving at the WTRU. For example, a RACH procedure to the SCG prior to a resume procedure or completion of a resume procedure may be allowed if data arriving at the WTRU is to be transmitted via an SCG bearer. The WTRU may determine whether it is allowed to access an SCG based on a combination of the above conditions. For example, a RACH procedure to the SCG prior to a resume procedure or completion of a resume procedure may be allowed if data arriving at the WTRU is to be transmitted via an SCG bearer and the LCH associated with the data is configured with an LCP restriction or specific L1 profile that allows the RACH procedure. The WTRU may determine whether it is allowed to access an SCG based on a comparison of the priority of data intended to the MCG and the SCG. For example, a RACH procedure to the SCG prior to a resume procedure or completion of a resume procedure may be allowed if the data pending at the WTRU at the time of the resume procedure indicates that the priority of the SCG data is higher than the priority of the MCG data. The WTRU may determine whether it is allowed to access an SCG based on information included in a paging message. For example, a RACH procedure to the SCG prior to a resume procedure or completion of a resume procedure may be requested by the network, such as via a specific indication in a paging message.

A WTRU configured to access an SCG prior to performing a resume procedure to an MCG may delay initiation of the resume procedure or one or more actions related to the resume procedure, for example, until successful completion of the access to the SCG. A WTRU may provide an indication of a successful SCG access or a failed SCG access to the network during a resume procedure. For example, the WTRU may include an SCGFailureInformation message in a resume complete message. The WTRU may include a pass/fail indication in a resume message to indicate a pass/fail status of the SCG access prior to the resume procedure. The WTRU may select from a subset of RACH preambles to indicate a pass/fail status of the SCG access prior to the resume procedure. The WTRU may select a RACH type (e.g., 2-step RACH versus 4-step RACH) or include a pass/fail indication in the data transmitted with a 2-step RACH procedure.

A WTRU may be configured to handle an MCG failure during (e.g., concurrent with) an acceptability indication procedure towards an SCG. For example, the WTRU may detect an RLF associated with the MCG while a procedure associated with acceptability indication or conditional SCG configuration has been started or is ongoing. In such case, the WTRU may not declare RLF, e.g., immediately. The WTRU may wait for the result of the acceptability indication or conditional SCG configuration towards the SCG. The WTRU may indicate an MCG failure based on a determination that the acceptability indication or conditional SCG configuration towards the SCG is successful. The WTRU may declare RLF based on an unsuccessful acceptability indication towards the SCG. The WTRU may be configured with a timer or time period for completing an acceptability indication or conditional SCG configuration, and the WTRU may trigger connection re-establishment if an acceptability indication or conditional SCG configuration is not completed prior to the expiration of the timer or the time period.

A WTRU may provide SCG acceptability information via a RACH procedure (e.g., a 2-step RACH procedure) to the MCG. A WTRU may initiate a RACH procedure to the MCG to indicate whether a stored, configured and/or suspended SCG is acceptable or not. In examples, the WTRU may initiate a new RACH procedure to indicate the acceptability of a stored, configured, and/or suspended SCG. In examples, the WTRU may provide the acceptability information in a RACH procedure triggered for other purposes (e.g., for resume to RRC_CONNECTED). The WTRU may perform a RACH procedure to the MCG while resuming to a RRC_CONNECTED state, and may provide in the RACH procedure an indication of the validity of a SCG configuration. The WTRU may provide acceptability information as part of the payload of a two-step RACH procedure (e.g., in MSG B of the RACH procedure). The WTRU may provide an indication in an MSG B regarding whether an SCG is valid. The WTRU in RRC_CONNECTED with a suspended and/or dormant SCG may be configured with one or more dedicated preambles that are associated with an acceptable or unacceptable SCG and may perform a RACH procedure using an appropriate preamble (e.g., depending on the WTRU's measurements and determination of the acceptability of the SCG). The WTRU may perform such a RACH procedure based on receiving an indication from the network (e.g., a PDCCH order) to perform the RACH procedure.

A WTRU may transmit a medium access control (MAC) control element (CE) to an MCG with information or an indication of the acceptability of an SCG. A WTRU may transmit a MAC CE to the MCG to indicate the acceptability of an SCG, a reason for unacceptability, the specific SCG configuration for which the WTRU is reporting acceptability information, and/or any combination thereof.

A WTRU may be configured to support concurrent (e.g., co-existing) CPAC and CHO configurations, including receiving CPAC and CHO configurations concurrently. In examples, the WTRU may receive an RRC configuration or reconfiguration message associated with CPAC (e.g., associated with a CPAC configuration), when an RRC configuration or reconfiguration associated with CHO may already exist (e.g. may already be stored) on the WTRU and/or when the WTRU may have already started monitoring trigger conditions for CHO. The WTRU may receive a CPAC configuration via one or more signaling radio bearers (SRBs) such as SRB1 or SRB3. The CPAC configuration may be associated with an intra-secondary node (intra-SN) or inter-secondary node (inter-SN) change. In examples, the WTRU may receive an RRC configuration or reconfiguration message associated with CHO (e.g., associated with a CHO configuration), when an RRC configuration or reconfiguration associated with CPAC may already exist (e.g., may already be stored) on the WTRU and/or when the WTRU may have already started monitoring trigger conditions for CPAC. The WTRU may receive a CHO configuration via one or more SRBs such as via SRB1.

A WTRU may be configured to take one or more of the following example approaches to handle a CPAC configuration or reconfiguration if the WTRU is configured with both CPAC and CHO configurations. Different WTRU behaviors may be defined herein based on WTRU and/or network capabilities to support concurrent (e.g., co-existing) CPAC and CHO configurations. For instance, some WTRUs may be capable of handling co-existing CPAC and CHO configurations, but may not be configured to monitor both CPAC and CHO trigger conditions. Some WTRUs may be capable of monitoring both CPAC and CHO trigger conditions, but may be configured to execute one configuration or reconfiguration (e.g., for CPAC or CHO) at a time. Some WTRUs may be capable of executing both CPAC and CHO configuration or reconfigurations at the same time. In a first example approach, the WTRU may be configured to execute one (e.g., only one) of the configurations (e.g., for CHO or CPAC). The WTRU may be configured to send an indication to a SCG (e.g., to a SN associated with the SCG) if the WTRU receives a CPAC configuration while the WTRU has already received and/or stored a valid CHO configuration. The WTRU may be configured to send an indication to an SCG (e.g., to an SN associated with the SCG) if the WTRU receives a CHO configuration (e.g., from a MN) while the WTRU has already received and/or stored a valid CPAC configuration. The indication sent by the WTRU may indicate that the WTRU may not be able to comply with the CPAC configuration or the CHO configuration (e.g., since the other one of the CPAC or CHO configuration already exists on the WTRU). The indication may list having conflicting configurations from a MN as a reason for not being able to comply with the CPAC configuration or the CHO configuration.

In a second example approach, the WTRU may be configured to receive and/or store both CPAC and CHO configurations. The WTRU may choose to monitor the trigger conditions associated with CHO and ignore monitoring the trigger conditions associated with CPAC, or the WTRU may choose to monitor the trigger conditions associated with CPAC and ignore monitoring the trigger conditions associated with CHO.

In a third example approach, the WTRU may be configured to receive and/or store the CPAC and CHO configurations, and to monitor the trigger conditions associated with both CPAC and CHO configurations.

The behaviors of the WTRU when trigger conditions associated with CHO and CPAC are met (e.g., simultaneously) may be defined or preconfigured (e.g., by a network entity). For example, the WTRU may be configured to perform one or more actions associated with a CPAC configuration based on the status of one or more trigger conditions associated with a CHO configuration. The WTRU may be configured with one or more of the following behaviors.

The WTRU may prioritize a CHO over a CPAC. For example, the WTRU may be configured to prioritize a CHO over a CPAC if one or more trigger conditions associated with both CHO and CPAC are satisfied (e.g., at the same time). In examples, the WTRU may abort an ongoing CPAC action, for example, if one or more trigger conditions for a CHO are satisfied. The WTRU may be configured to release one or more (e.g. all) CPAC configurations and/or to stop monitoring trigger conditions associated with CPAC configurations.

The WTRU may disable one or more CPAC actions. For example, the WTRU may be configured to disable one or more actions related to CPAC in response to determining that a CHO trigger is about to occur (e.g., based on the WTRU's evaluation of one or more CHO trigger conditions). The WTRU may be configured to disable one or more CPAC actions based on a preconfigured trigger condition. In examples, the preconfigured trigger condition may be a measurement event that is associated with a CHO trigger condition. For example, the WTRU may be configured to stop monitoring trigger conditions associated with CPAC if a CHO trigger condition satisfies an entry condition (e.g., if a timer associated with the CHO trigger condition is running).

The WTRU may support concurrent execution of CHO and CPC (e.g., instead of prioritizing one over the other), including triggering or performing CHO and CPAC, e.g., simultaneously. For example, the WTRU may trigger a CHO while a CPAC is ongoing or the WTRU may trigger a CHO while a CPAC is ongoing.

Behaviors of a WTRU as described in other parts of this disclosure (e.g., relating to conditional reconfiguration, monitoring of triggering conditions for the conditional reconfiguration, messaging between the WTRU and a network node in association with the conditional reconfiguration) may not be affected by the WTRU receiving and handling concurrent CHO and CPC configurations.

A WTRU may be configured to transmit (e.g., in an RRC complete message such as an RRCReconfigurationComplete message) an indication of a CPAC execution trigger condition being satisfied. The indication may be transmitted to a cell that may depend on the progress or trigger of a CHO. The WTRU may transmit an indication of a CPAC execution trigger being satisfied to a CHO candidate (e.g., the target of a triggered CHO). The WTRU may transmit an indication of a CPAC execution trigger being satisfied to a PCell to which the WTRU is connected prior to triggering a CHO. The WTRU may determine a destination cell(s) for the indication based on the timing of the triggers for the CHO and/or the CPAC. In examples, the WTRU may transmit the indication to the source PCell if the CPAC is triggered simultaneously with the CHO. In examples, the WTRU may transmit the indication to the source PCell if the trigger time of the CHO occurs after the trigger time of the CPAC. In examples, the WTRU may transmit the indication to the CHO target if the CPAC trigger conditions are satisfied after the CHO is triggered such as when the CPAC trigger conditions are satisfied after an offset time has passed since the CHO is triggered. The offset time may be a configured time period or may be defined in terms of the steps or operations taken by the WTRU in association with the CHO. For example, the WTRU may send the indication to the CHO target if the WTRU has completed synchronization with the CHO target, if the WTRU has applied the CHO target cell configuration, etc.

A WTRU may be configured to not transmit an indication of CPAC execution in some situations (e.g., if CPAC is triggered simultaneously with CHO, if CPAC is triggered during an ongoing CHO, etc.). In examples, the WTRU may drop the transmission of such an indication if a trigger condition (e.g., for the CPAC) is satisfied during the execution of the CHO. In examples, if the trigger condition (e.g., for the CPAC) occurs following completion of the CHO (e.g., after reception of an acknowledgement associated with the transmission of a complete message to the target), the WTRU may transmit the indication.

A WTRU may be configured to transmit an indication of CPAC execution to a network node (e.g., to a secondary node) if the CHO fails. Such a failure may occur, for example, if the WTRU has not transmitted an indication of CPAC execution or has delayed the transmission of an indication of CPAC execution due to the occurrence of the CHO. The WTRU may include an indication of CPAC execution in a failure message (e.g., a MCGFailureInformation message), which may be transmitted after a failed CHO.

A WTRU may be configured to delay the transmission of an indication of CPAC execution until completion of a CHO. The WTRU may delay the transmission, for example, if the CPAC and CHO are triggered simultaneously, or if a CHO is ongoing at the time a CPAC trigger condition is met. The WTRU may delay the transmission of the indication if a CHO may be triggered in the near future (e.g., if a time to trigger associated with a CHO event is started). The WTRU may proceed with the transmission of the indication following a CHO completion or if the CHO was not triggered (e.g., if the time to trigger did not expire and/or if a CHO was not executed).

A WTRU may determine whether to send an indication of CPAC triggering to a master node or a secondary node, e.g., based on the configuration of an SRB (e.g., SRB3) and/or the execution of a CHO. For example, the WTRU may send the indication via SRB3 if SRB3 is configured and a CHO is ongoing.

A WTRU may be configured with an event (e.g., a measurement event) and/or a trigger condition that is applicable to both CHO and CPAC. For example, the WTRU may be configured with a single event that is applicable to both CHO and CPAC (e.g., by including a configuration of both an MCG and an SCG in a conditional reconfiguration candidate). The WTRU may be configured with an offset or threshold that is associated with a trigger condition (e.g., a measurement event), and the offset or threshold may be applied to a CHO or CPAC, e.g., if the trigger condition is applied to both the CHO and the CPAC. The WTRU may be configured to apply the CHO if the trigger condition is satisfied with a first threshold, and to apply the CPAC if the trigger condition is satisfied with a second threshold.

A WTRU may be configured to handle CPAC candidates based on a CHO or HO. The WTRU may be configured to perform one or more of the following when handling a CPAC configuration (e.g., upon completion of a CHO procedure). A radio resource configuration associated with a CPAC configuration may be a function of a current MCG. In examples, the WTRU may be configured to execute CHO while being connected to the same SCG. In examples, the WTRU may be configured to execute HO while being connected to the same SCG. The impacts of changing the MCG (e.g., switching to another MCG) while being connected to the same SCG may include that one or more stored CPAC configurations may or may not be valid in the target MCG. The WTRU may be configured to determine the validity of a stored CPAC configuration based on a CHO or HO procedure. The WTRU may be configured to indicate (e.g., to a secondary node) the status of the CHO or HO procedure. Such an indication may be used (e.g., by the secondary node) to determine whether a CPAC configuration is valid and/or to reconfigure (e.g., update) an existing CPAC configuration if it is no longer valid. One or more of the following techniques may be applicable for both CHO and HO, even though the techniques are described in the context of CHO.

A WTRU may be configured to perform one or more actions associated with a stored CPAC configuration (if present) if the WTRU successfully completes a CHO procedure and/or if a trigger condition associated with CHO is satisfied. The WTRU may be configured to perform one or more of the following. The WTRU may transmit an indication to a SCG (e.g., to a network node associated with the SCG) if the WTRU completes a CHO successfully. The WTRU may include an identity of a new PCell in the indication. The WTRU may transmit such an indication if an SRB (e.g., SRB3) is configured towards the SCG. The WTRU may transmit such an indication if the stored CPAC configuration was received from a secondary node, e.g., if the WTRU determines that a master node is not involved in the CPAC configuration.

The WTRU may transmit an indication to a SCG (e.g., to a network node associated with the SCG) if one or more trigger conditions associated with a CHO are satisfied. The WTRU may include an identity of the cell for which the one or more CHO trigger conditions are satisfied. The WTRU may transmit such an indication if an SRB (e.g., SRB3) is configured towards the SCG. The WTRU may transmit such an indication if a stored CPAC configuration was received from a secondary node, e.g., if the WTRU determines that a master node is not involved in the CPAC configuration.

The WTRU may be configured to release (e.g., autonomously release) a stored CPAC configuration if a CHO is completed successfully. The WTRU may stop monitoring trigger conditions associated with the released CPAC configuration. The WTRU may send an indication to the SCG (e.g., to a network node associated with the SCG) that indicates the release of the CPAC configuration.

The WTRU may be configured to suspend (e.g., autonomously suspend) a stored CPAC configuration if a CHO is completed successfully. The WTRU may stop monitoring trigger conditions associated with the suspended CPAC configuration. The WTRU may send an indication to the SCG (e.g., to a network node associated with the SCG) indicating the suspension of the CPAC configuration. The WTRU may be configured to receive a command (e.g., from the SCG) to activate and/or reconfigure the suspended CPAC configuration.

The WTRU may be configured to selectively release or suspend a CPAC configuration based on the completion of a CHO. The WTRU may be configured to suspend or release a CPAC configuration based on one or more of the following conditions. The WTRU may be configured to suspend or release the CPAC configuration based on the origin of the CPAC configuration. For example, the WTRU may be configured to release or suspend those CPAC configurations received from a secondary node and maintain the CPAC configurations received from a master node. The WTRU may be configured to release or suspend those CPAC configurations received from a master node and maintain the CPAC configurations received from a secondary node.

The WTRU may be configured to suspend or release a CPAC configuration based on the compatibility of the CPAC configuration with a cell group. For example, the WTRU may be configured to release a CPAC configuration that is no longer compatible with a new MCG after a CHO. The WTRU may be configured with the compatibility information of the CPAC configuration with respect to a (e.g., each) CHO candidate, for example, via a linkage configuration. The WTRU may maintain those (e.g., only those) CPAC configurations associated with a CHO candidate towards which a CHO is completed successfully.

The WTRU may be configured to suspend or release the CPAC configuration based on an explicit configuration. For example, the WTRU may be configured explicitly (e.g., by a network) regarding which one or more CPAC configurations may be maintained after a successful CHO or HO procedure. The WTRU may be configured explicitly (e.g., by a network) regarding which one or more CPAC configurations should be released after a successful CHO or HO procedure.

A WTRU may be configured to handle one or more CHO candidates based on a CPAC. The WTRU may be configured to handle a CHO configuration based on the completion of a CPAC procedure. A radio resource configuration associated with the CHO configuration may be a function of a current SCG associated with the WTRU. In examples, the WTRU may be configured to perform a CPAC while one or more CHO configurations are stored, and/or if the WTRU is connected to the same MCG.

The WTRU may be configured to determine the validity of a stored CHO configuration based on the execution of a CPAC procedure. The WTRU may be configured to indicate to a master node the status of the CPAC procedure. Such an indication may be used by the master node to determine whether a CHO configuration is valid and/or to reconfigure the CHO configuration if the CHO configuration is no longer valid.

A WTRU may be configured to determine potential CHO candidates as a function of a serving SCG. The WTRU may be configured with an association (e.g., a mapping) between CPAC configurations and CHO configurations. More than one CPAC configuration may be associated to a same CHO configuration and vice versa. The WTRU may be configured to activate and deactivate one or more linked CHO configurations, for example, if the serving SCG is changed due to a CPAC procedure. The WTRU may release a CHO configuration that is not linked to the current SCG. The WTRU may be configured to report an indication to the MCG (e.g., to a network node associated with the MCG) regarding the status of a CHO candidate based on a successful CPAC completion. The WTRU may be configured to perform one or more of the function described herein for (e.g., only for) CPAC configurations configured by a SCG.

A WTRU may be configured to perform one or more actions associated with a stored CHO configuration (if present) if the WTRU successfully completes a CPAC procedure, if a trigger condition associated with CPAC is satisfied, etc. The WTRU may be configured with one or more of the following behaviors.

The WTRU may transmit an indication to an MCG (e.g., to a network node associated with the MCG) when the WRU completes a CPAC (e.g., if the CPAC completes successfully, if the CPAC results in a failure, etc.). The WTRU may include an identity of a new PSCell in the indication. The WTRU may transmit such an indication if the relevant CPAC configuration was received from a SCG (e.g., from a network node associated with the SCG). The WTRU may transmit such an indication if the CPAC configuration was received from a secondary node, e.g., if the WTRU can determine that a master node is not involved in the CPAC configuration.

The WTRU may transmit an indication to an MCG (e.g., to a network node associated with the SCG) if one or more trigger conditions associated with CPAC are satisfied. The WTRU may include an identity of the cell for which the CPAC conditions are satisfied. The WTRU may transmit such an indication if the CPAC configuration was received from a secondary node, e.g., if the WTRU can determine that the master node is not involved in the CPAC configuration.

The WTRU may selectively release or suspend a CHO configuration based on a CPAC completion. The WTRU may be configured to suspend or release a CHO configuration based on one or more of the following conditions. The WTRU may be configured to suspend or release a CHO configuration based on the origin of the CPAC configuration. For example, the WTRU may be configured to suspend or release the CHO configuration if the CPAC configuration was received from a secondary node.

The WTRU may be configured to suspend or release a CHO configuration based on an explicit configuration. For example, the WTRU may be configured explicitly regarding which one or more CHO configurations should be maintained after a successful CPAC procedure. The WTRU may be configured explicitly regarding which one or more CHO configurations should be released after a successful CPAC procedure.

A WTRU may be configured to handle concurrent CPAC configurations initiated by a master node (MN) and a second node (SN). A CPAC configuration from one cell group may override a CPAC configuration from another cell group. A WTRU may be configured to receive a CPAC configuration from a MN or a SN. The WTRU may be configured to handle CPAC configurations from one (e.g., only one) cell group on a preconfigured condition. One or more of the following may be applicable, for example, if a CPAC configuration is prioritized based on the SRB (e.g., SRB1 or SRB3) on which the CPAC configuration is received. The examples described herein in the context of a CPAC configuration initiated by an MN and/or an SN may be also applicable to situations in which an RRC reconfiguration initiated by the MN and/or the SN may impact a stored SCG configuration and/or an active SCG configuration. The examples described herein may be also applicable if the WTRU is configured to (e.g., upon reception of an RRC reconfiguration from the MN) store at least one CPAC initiated by the SN at the WTRU. The examples described herein may be also applicable if the WTRU is configured to (e.g., upon reception of an RRC reconfiguration from the SN) store at least one CPAC initiated by the MN at the WTRU.

A WTRU may be configured to prioritize CPAC configurations based on an earliest arrival time of the CPAC configurations. In examples (e.g., if the WTRU receives a CPAC configuration from a SN while the WTRU has a valid CPAC configuration received from a MN and stored at the WTRU), the WTRU may ignore the CPAC configuration received from the SN. The WTRU may be configured to send a failure message to the SN indicating the inability to comply with the CPAC configuration and a reason for the inability (e.g., an earlier configuration from a different cell group exists at the WTRU). In examples (e.g., if the WTRU receives a CPAC configuration from a MN while the WTRU has a valid CPAC configuration received from a SN and stored at the WTRU), the WTRU may ignore the CPAC configuration received from the MN. The WTRU may be configured to send a failure message to the MN indicating the inability to comply with the CPAC configuration and a reason for the inability (e.g., an earlier configuration from a different cell group exists at the WTRU).

A WTRU may be configured to prioritize CPAC configurations based on a latest arrival time of the CPAC configurations. In examples (e.g., if the WTRU receives a CPAC configuration from a SN while the WTRU has a valid CPAC configuration received from a MN), the WTRU may release the CPAC configuration received from the MN and handle (e.g., store) the CPAC configuration received from the SN. The WTRU may be configured to send a failure message to the MN indicating the inability to comply with the CPAC configuration and a reason for the inability (e.g., the CPAC configuration is overridden by a new or later-arriving configuration).

In examples (e.g., if the WTRU receives a CPAC configuration from an MN while the WTRU has a valid CPAC configuration received from an SN), the WTRU may release the CPAC configuration received from the SN and handle (e.g., store) the CPAC configuration received from the MN. The WTRU may be configured to send a failure message to the SN indicating the inability to comply with the CPAC configuration and a reason for the inability (e.g., the CPAC configuration is overridden by a new or later-arriving configuration).

A WTRU may be configured to prioritize CPAC configurations based on a cell group or SRB associated with the WTRU. In examples, the WTRU may prioritize a CPAC configuration received from a MN irrespective of the presence of an earlier CPAC configuration received from a SN. In examples, the WTRU may be configured to prioritize a CPAC configuration received on a first SRB (e.g., SRB1) over a CPAC configuration received on a second SRB (e.g., SRB3).

A WTRU may be configured to prioritize CPAC configurations based on an explicit indication. The WTRU may be configured to determine a priority of a CPAC configuration based on an explicit priority indication such as one included as a part of the CPAC configuration. The WTRU may be configured to override a low priority CPAC configuration with a high priority CPAC configuration.

A WTRU may be configured to handle a CPAC configuration from one cell group as a function of a CPAC configuration from another cell group. The WTRU may be configured to receive and handle CPAC configurations from an MCG and an SCG. The WTRU may be configured with rules for handling CPAC configurations if the WTRU receives a CPAC configuration associated with the same target PSCell. For example, the WTRU may be configured to replace or modify an existing CPAC configuration with another CPAC configuration (e.g., a new CPAC configuration) if the PSCell configuration associated with the CPAC configurations is same. The WTRU may be configured to replace or modify an existing CPAC configuration if (e.g., only if) an earlier CPAC configuration was received from the same cell group. The WTRU may be configured to report (e.g., to a network node) the cell group whose CPAC configuration was overridden or modified.

A WTRU may be configured to handle a SCG failure, for example, if CPAC is configured. The WTRU may trigger a SCG failure (e.g., a SCG RLF, a CPAC failure, etc.) if CPAC is configured for the WTRU. The WTRU may initiate a CPAC on a PSCell candidate (e.g., a stored PSCell candidate based on previously received configuration messages), for example, with or without transmitting an SCGFailureInformation message to a MN.

The WTRU may determine which one or more of the above-mentioned behaviors to follow (e.g., trigger a CPAC and/or perform a SCG failure procedure) based on one or more of the following. The WTRU may determine its behavior based on the presence of a CHO configuration and/or a currently ongoing CHO procedure. For example, the WTRU may perform a CPAC to a candidate PSCell following a SCG failure if the WTRU is currently executing a CHO at the time the CPAC is triggered. The WTRU may initiate a SCG failure procedure (e.g., transmitting a SCG failure indication such as a SCGFailureInformation message) to a MN.

The WTRU may determine its behavior based on the node (MN or SN) that configured the CPAC and/or the SRB that was used to configure the CPAC. For example, the WTRU may perform a CPAC to a candidate PSCell following a SCG failure if the CPAC candidate was configured by the SN or was configured via a certain SRB such as SRB3. Otherwise, the WTRU may initiate a SCG failure procedure (e.g., transmitting a SCGFailureInformation message).

The WTRU may determine its behavior based on the presence of a CHO configuration such as a CHO configuration linked to a CPAC configuration. For example, the WTRU may perform a CPAC to a candidate PSCell following an SCG failure if the WTRU does not have a CHO configuration linked to the CPAC candidate. If the WTRU has a CHO configuration at the occurrence of the SCG failure or if such a CHO configuration is linked to the CPAC candidate, the WTRU may initial a SCG failure procedure (e.g., transmitting a SCGFailureInformation message to the MN).

Figure 3:
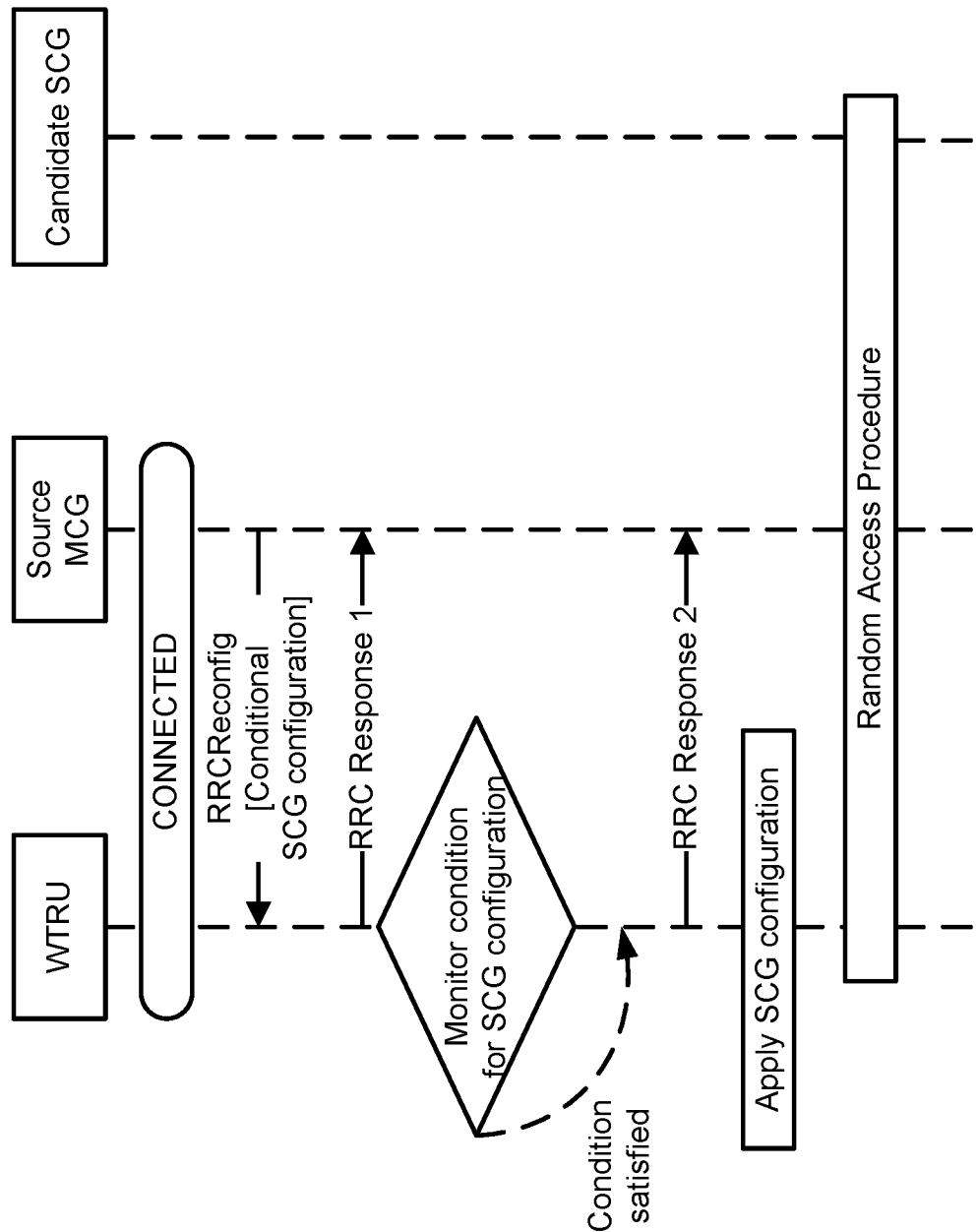
FIG. 3 is a diagram illustrating an example of applying an SCG configuration based on a condition.

An SCG may be added for a WTRU. FIG. 3 illustrates an example of applying an SCG configuration if a condition is satisfied. A WTRU may be in a connected state with a source MCG. The WTRU may receive a message (e.g., a RRCReconfiguration or RRCConnectionReconfig message) from the MCG (e.g., a MN associated with the MCG) that includes or indicates an SCG configuration, an SCG reconfiguration, and/or a trigger condition for performing the SCG configuration or reconfiguration (e.g., the SCG configuration or reconfiguration may be conditional). As described herein, the SCG configuration or reconfiguration may be related to a PSCell change or addition. Responsive to receiving the message, the WTRU may store the SCG configuration or reconfiguration and may start monitoring the trigger condition included or indicated in the message. The WTRU may be configured to transmit a first message (e.g., RRC Response 1 in FIG. 3) to the MN based on the reception of the configuration message. The WTRU may indicate in the first message (e.g., RRC response 1) that the WTRU has received and/or stored the conditional SCG configuration or reconfiguration and has started to monitor the trigger condition included therein (e.g., so that the network may be aware of the state and/or subsequent actions of the WTRU). In examples, the first message (e.g., RRC response 1) may correspond to an RRC reconfiguration complete message. If the trigger condition is satisfied (e.g., at a later point in time), the WTRU may transmit a second message (e.g., an RRC response such as RRC Response 2 in FIG. 3) to the MN. The WTRU may indicate in the second message (e.g., RRC response 2) that the trigger condition for application of the conditional SCG configuration or reconfiguration is satisfied. The WTRU may apply the SCG configuration or reconfiguration in response to determining that the trigger condition is satisfied. For example, the WTRU may initial a RACH procedure to the candidate SCG. The WTRU may indicate the application of the conditional SCG reconfiguration to the network (e.g., the MSG or MN), for example, in the second message (e.g., RRC Response 2 in FIG. 3) or in a different message. In examples, the second message (e.g., RRC response 2) may correspond to an RRC reconfiguration complete message. Further, as described herein, the application of (e.g., the performance of a RACH procedure based on) the conditional SCG reconfiguration may result in a failure. In such situations, the WTRU may transmit a third message to the MN and the third message may indicate the failure. In examples, the third message may correspond to an RRC reconfiguration failure message.

Figure 4:
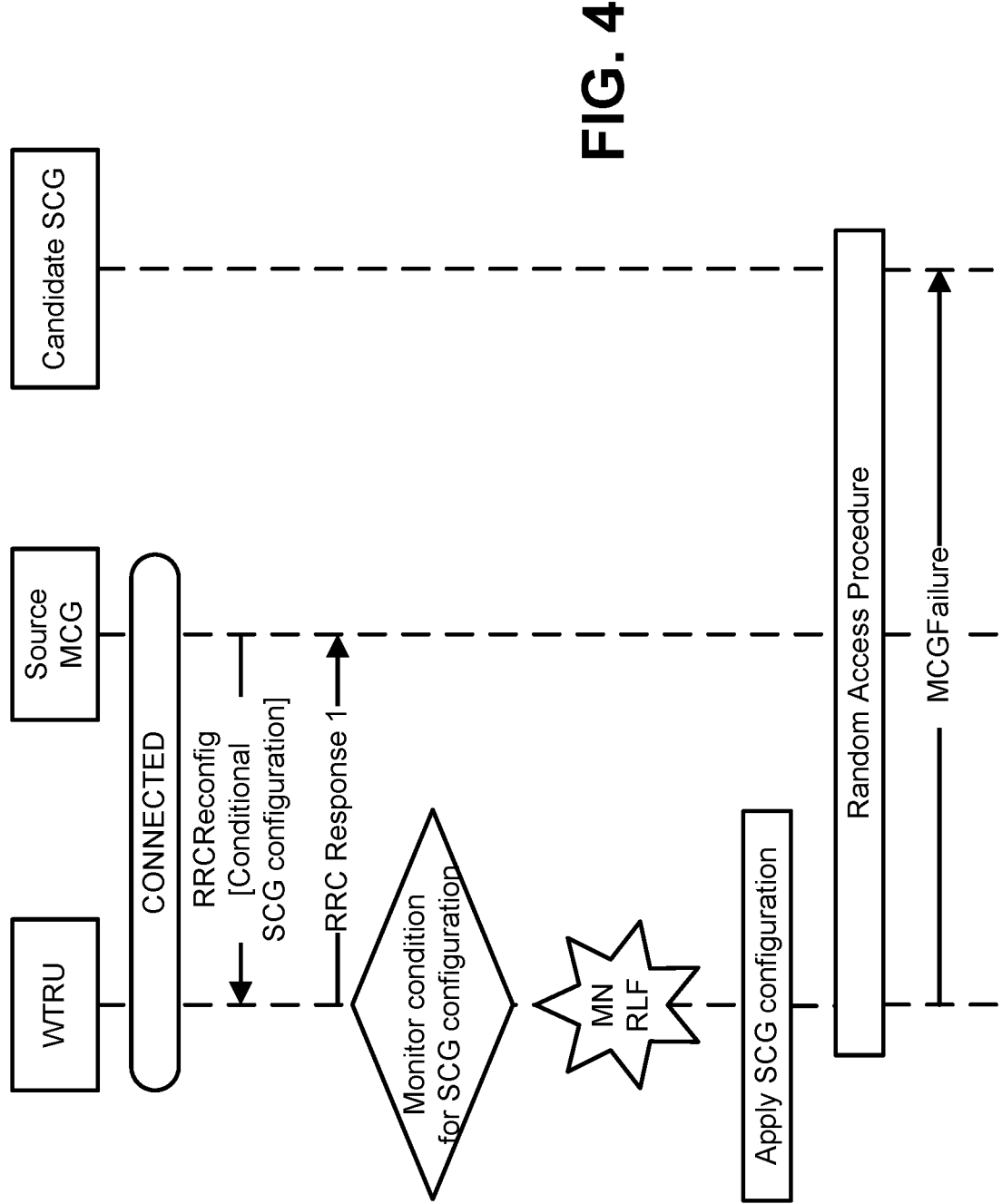
FIG. 4 is a diagram illustrating an example of applying an SCG configuration based on the detection of a radio link failure.

FIG. 4 illustrates an example of applying an SCG configuration or reconfiguration (e.g., a conditional SCG configuration or reconfiguration as described herein) if there is an RLF. The WTRU may detect a radio link problem such as an RLF, e.g., in an MCG, while monitoring trigger conditions for application of an SCG configuration or reconfiguration. In such situations, the WTRU may expedite the application of a stored SCG configuration and may access the corresponding SCG (e.g., via a random access procedure), for example, without waiting for a trigger condition to be satisfied. If the random access is successful, the WTRU may indicate an MCG failure to the SCG. If the WTRU cannot access the SCG, the WTRU may declare RLF. A WTRU may be configured with a generic cell group configuration such that the configuration can be applied as an MCG configuration or an SCG configuration. In the case of MCG RLF, the WTRU may promote the generic cell group configuration as an MCG configuration and execute a conditional handover towards the MCG corresponding to the promoted MCG configuration.

Figure 5:
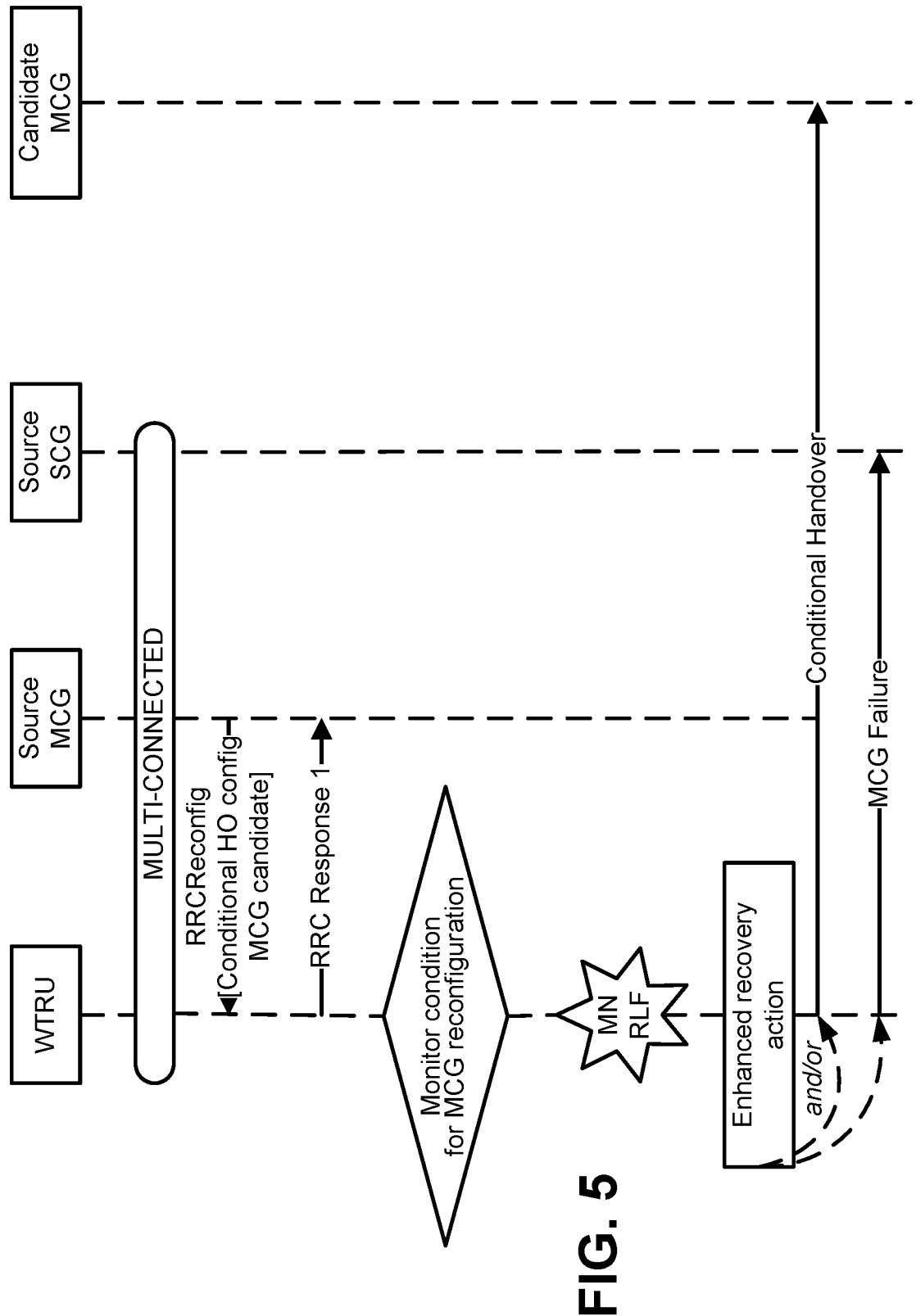
FIG. 5 is a diagram illustrating an example of an enhanced recovery action.

A WTRU may be configured to apply a conditional MCG reconfiguration, e.g., while connected to an SCG. FIG. 5 illustrates an example of a WTRU performing an enhanced recovery action. The WTRU may be configured with multi-connectivity, e.g., connected to a source MCG and a source SCG. The WTRU may receive a conditional reconfiguration associated with the MCG. The WTRU may start monitoring trigger conditions for the conditional MCG reconfiguration. In examples, the WTRU may encounter a radio link problem in the source MCG, e.g., while waiting for a trigger condition for a candidate MCG. In such case, the WTRU may be configured to perform one or more enhanced recovery actions. The enhanced recovery actions may include one or more of the following. The enhanced recovery actions may include transmitting MCG failure information via the source SCG. The enhanced recovery actions may include trigger a connection re-establishment. For example, if the WTRU selects a candidate MCG, the WTRU may perform a CHO (e.g., to the candidate MCG) using a stored MCG reconfiguration. The WTRU may be configured with one or more rules concerning whether to transmit MCG failure information via the source SCG and/or to trigger a connection re-establishment. The one or more rules may be based on evaluation of the cell quality associated with the source SCG and a candidate MCG, the presence of an SCG bearer, the presence of SRB3 or split SRB1/2, etc.

In examples, a WTRU may be configured to transmit MCG failure information via a source SCG for recovery if one or more of the following conditions are satisfied. The WTRU may be configured to transmit MCG failure information via the source SCG if the quality of the source SCG is better than a cell quality threshold and the quality of a candidate MCG is lower than a cell quality threshold. The WTRU may be configured to transmit MCG failure information via the source SCG if the source SCG is configured with SRB3 and/or split SRB1/2. If none of the conditions are satisfied, the WTRU may trigger a connection re-establishment. When performing the connection re-establishment, the WTRU may transmit the MCG failure information to the SCG, e.g., if the cell quality of the SCG meets a minimum threshold.

In one or more recovery options, a WTRU may be configured with rules to determine the release of a source SCG connection and/or a SCG configuration. For example, the WTRU may be configured to continue data transmissions towards a source SCG until the result of conditional reconfiguration on the MCG is known. If a conditional handover on the MCG fails, the WTRU may indicate the failure by sending MCG failure information to the source SCG. If the conditional handover on the MCG is successful, the WTRU may release the source SCG configuration, e.g., if the source SCG configuration is not linked to the candidate MCG configuration. If the source SCG configuration is linked to the candidate MCG configuration, the WTRU may retain the source SCG configuration.

Figure 6:
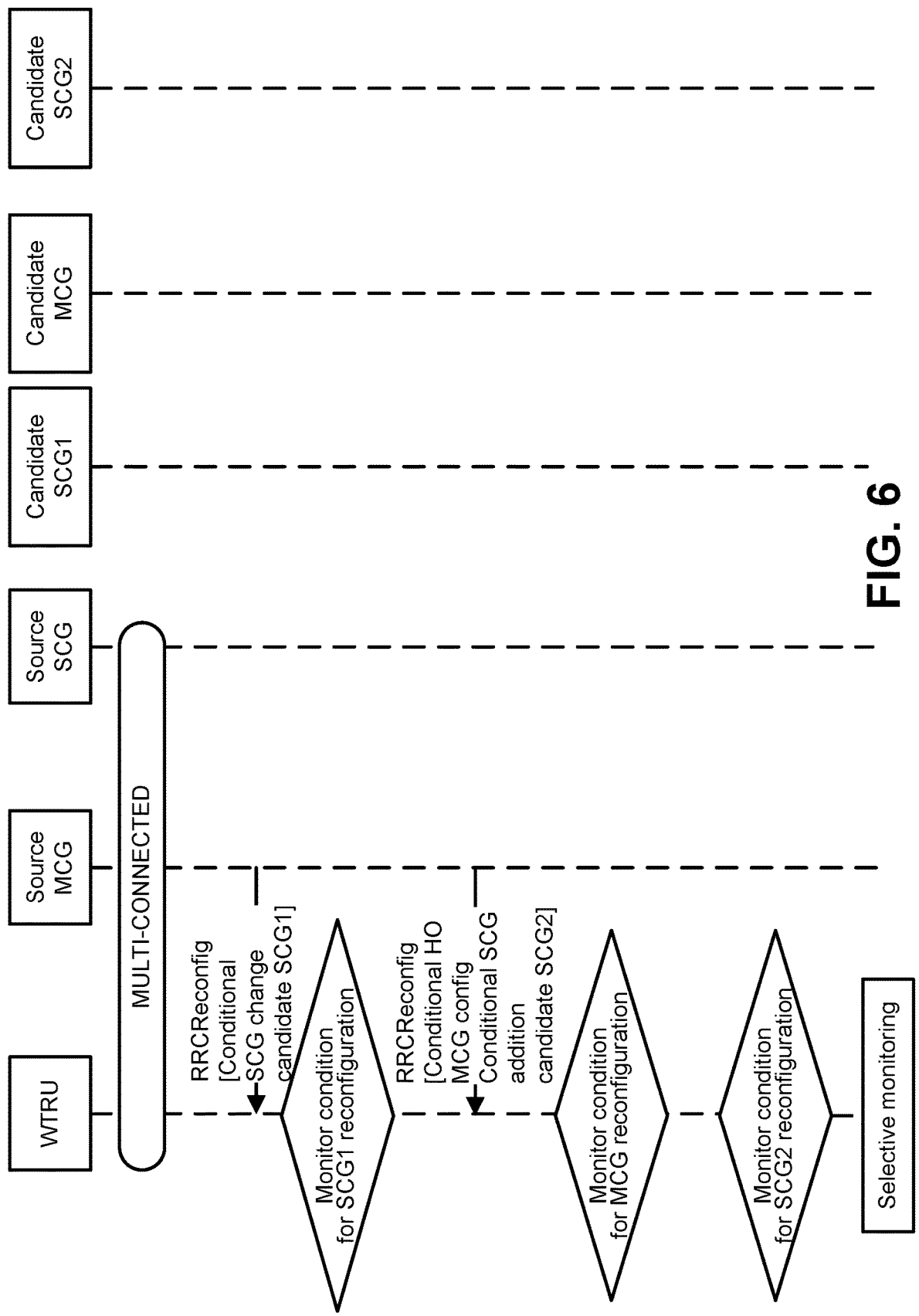
FIG. 6 is a diagram illustrating an example of monitoring for multiple conditional reconfigurations.

A WTRU may be provided with concurrent conditional MCG reconfiguration and SCG reconfiguration. FIG. 6 illustrates an example of a WTRU monitoring for conditional configuration or reconfiguration. The WTRU may be configured with multi-connectivity, e.g., connected to a source MCG and a source SCG. The WTRU may receive a RRC message such as an RRCReconfiguration message that includes an SCG configuration or reconfiguration (e.g., a conditional SCG configuration or reconfiguration) for a candidate SCG1 and a trigger condition for the configuration or reconfiguration. The WTRU may store the SCG configuration or reconfiguration and may start monitoring the trigger condition associated with SCG1. Such a reconfiguration may correspond to an SCG change procedure. The WTRU may also receive an RRC reconfiguration message that includes a conditional MCG configuration or reconfiguration, e.g., corresponding to a handover to a candidate MCG. The WTRU may also receive a conditional SCG configuration or reconfiguration, e.g., corresponding to an addition of SCG2 that is linked to the candidate MCG. In terms of monitoring for the conditional reconfigurations, the WTRU may be configured to perform one or more of the following. The WTRU may perform monitoring for the three candidates: candidate SCG1, candidate SCG2 and candidate MCG. The WTRU may perform selective monitoring, where one or more of the following may apply. The WTRU may be configured to monitor one layer (e.g., one of the candidates). For example, the WTRU may suspend monitoring for SCG if configured with a candidate MCG reconfiguration. The WTRU may choose a subset of the SCG reconfigurations to monitor in addition to monitoring the MCG reconfiguration. For instance, the WTRU may perform monitoring for candidate SCG1 and the candidate MCG and may suspend monitoring for candidate SCG2. The WTRU may start monitoring a trigger condition for SCG2 if the candidate MCG satisfies the trigger condition. The WTRU may monitor the candidate MCG and the candidate SCG2 and may suspend monitoring for candidate SCG1.

If there is successful reconfiguration to the candidate MCG, the WTRU may be configured to perform one of the following. The WTRU may release the source SCG configuration if the candidate MCG reconfiguration is triggered. The WTRU may release the source SCG configuration if the source SCG is not linked to the candidate MCG configuration. The WTRU may continue with the source SCG configuration until there is an explicit indication from the candidate MCG.

In example implementations, a WTRU may be configured with a conditional reconfiguration information element (IE) (e.g., conditionalReconfiguration) in an RRC message such as an RRCReconfiguration message. Such an IE may carry information about a target PCell (e.g., for MCG reconfiguration) and/or a target PSCell (e.g., for SCG reconfiguration) with respective associated trigger conditions. The WTRU may receive a conditional reconfiguration IE (e.g., such as conditionalReconfiguation) associated with a PSCell change via SRB3 and a conditional reconfiguration IE associated with a PCell change via SRB1. The WTRU may be configured to ensure one (e.g., only one) conditional reconfiguration IE associated with an MCG or an SCG is active.

A stored PSCell conditional reconfiguration IE may be removed based on the reception of a PCell conditional reconfiguration IE. A conditional handover configuration (CHO-Config) may be added or modified. A WTRU may (e.g., for a CHO-ConfigId received in the cho-ConfigToAddModList IE, for each CHO-ConfigId received in the cho-ConfigToAddModList IE, etc.), perform one or more the following. The WTRU may remove the entry associated with sn-ExecutionCond in VarCHO-Config and report an SCG configuration failure (e.g., in accordance with an inability to comply with RRCReconfiguration received over SRB3 and/or based on a conflict with an MCG configuration) if the cho-ConfigToAddModList includes mn-ExecutionCond and at least one entry with sn-ExecutionCond exists in the cho-ConfigToAddModList within the VarCHO-Config. The WTRU may replace the entry with the value received for this CHO-ConfigId if an entry with the matching CHO-ConfigId exists in the cho-ConfigToAddModList within the VarCHO-Config. The WTRU may add a new entry for the CHO-ConfigId within the VarCHO-Config if an entry with the matching CHO-ConfigId does not exist in the cho-ConfigToAddModList within the VarCHO-Config. The WTRU may perform conditional handover monitoring, e.g., as specified herein.

A WTRU may be configured to ignore a received PSCell conditionalReconfiguration, for example, if at least one PCell conditionalReconfiguration is stored. A WTRU may (e.g., for a CHO-ConfigId received in the cho-ConfigToAddModList IE, each CHO-ConfigId received in the cho-ConfigToAddModList IE, etc.), perform one or more the following. The WTRU may report a SCG configuration failure (e.g., in accordance with an inability to comply with an RRCReconfiguration received over SRB3 and/or based on a conflict with an MCG configuration) if the cho-ConfigToAddModList includes sn-ExecutionCond and at least one entry with mn-ExecutionCond exists in the cho-ConfigToAddModList within the VarCHO-Config. The WTRU may replace the entry with the value received for the CHO-ConfigId if the cho-ConfigToAddModList includes sn-ExecutionCond, no entry with mn-ExecutionCond exists in the cho-ConfigToAddModListwithin the VarCHO-Config and an entry with the matching CHO-ConfigId exists in the cho-ConfigToAddModList within the VarCHO-Config. The WTRU may add a new entry for this CHO-ConfigId within the VarCHO-Config if the cho-ConfigToAddModList includes sn-ExecutionCond, no entry with mn-ExecutionCond exists in the cho-ConfigToAddModList within the VarCHO-Config and an entry with the matching CHO-ConfigId does not exist in the cho-ConfigToAddModList within the VarCHO-Config. The WTRU may perform conditional handover monitoring, e.g., as specified herein, if the cho-ConfigToAddModList includes sn-ExecutionCond but no entry with mn-ExecutionCond exists in the cho-ConfigToAddModList within the VarCHO-Config.

The logics described above may be illustrated by the following:

---

For each CHO-ConfigId received in the cho-ConfigToAddModList IE the WTRU shall:
    1>    If the cho-ConfigToAddModList includes mn-ExecutionCond:
        2>    If at least one entry with sn-ExecutionCond exists in the cho-ConfigToAddModList within the VarCHO-Config:
            3> remove the entry associated with sn- ExecutionCond in VarCHO-Config.
            3> report SCG configuration failure, in accordance to the subclause corresponding to 'inability to comply with RRCReconfigu ration received over SRB3' , possibly with new clause 'conflicting with MCG configuration'
    1>    if an entry with the matching CHO-ConfigId exists in the cho-ConfigToAddModList within the VarCHO-Config:
        2> replace the entry with the value received for this CHO-ConfigId;
    1>    else:
        2> add a new entry for this CHO-ConfigId within the VarCHO-Config;
    1>    perform conditional handover monitoring as specified herein;

---

For each CHO-ConfigId received in the cho-ConfigToAddModList IE the WTRU shall:
    1>    If the cho-ConfigToAddModList includes sn-ExecutionCond:
        2>    If atleast one entry with mn-ExecutionCond exists in the cho-ConfigToAddModList within the VarCHO-Config:
            3> report SCG configuration failure, in accordance to the subclause corresponding to 'inability to comply with RRCReconfigu ration received over SRB3' , possibly with new failure clause 'conflicting with MCG configuration'
        2> else
            3>    if an entry with the matching CHO-ConfigId exists in the cho-

```
ConfigToAddModList within the VarCHO-Config:
            4>      replace the entry with the value received for this CHO-ConfigId;
    3>      else:
            4>      add a new entry for this CHO-ConfigId within the VarCHO-Config;
    3>  perform conditional handover monitoring as specified herein;
```

Although the features and elements of the present disclosure may consider New Radio (NR) or 5G specific protocols, it is understood that the solutions described herein are not restricted to this scenario and are applicable to other wireless systems as well. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in devices described herein.

What is claimed is:

1. A wireless transmit receive unit (WTRU), comprising:
   a processor configured to:
      perform one or more uplink transmissions via a master cell group (MCG) while a secondary cell group (SCG) is deactivated;
      transmit an indication regarding the SCG to a base station in response to determining that data associated with the SCG is available for transmission;
      receive a radio resource control (RRC) message from the base station, wherein the RRC message indicates a conditional reconfiguration of the SCG that includes a primary secondary cell (PSCell) to be applied by the WTRU and a measurement condition for application of the conditional reconfiguration;
      responsive to receiving the RRC message, transmit a first message to the base station, wherein the first message indicates that the WTRU has received the RRC message;
      determine that the measurement condition for application of the conditional reconfiguration is satisfied;
      transmit a second message to the base station, wherein the second message indicates that the measurement condition for application of the conditional reconfiguration is satisfied;
      apply the conditional reconfiguration; and
      after having transmitted the second message indicating satisfaction of the measurement condition for application of the conditional reconfiguration and based on a determination that the application of the conditional reconfiguration has resulted in a failure based on a timer associated with completing the conditional reconfiguration of the SCG that includes the PSCell expiring, transmit a third message to the base station, wherein the third message indicates the failure.

2. The WTRU of claim 1, wherein the conditional reconfiguration is associated with a primary secondary cell (PSCell) change or a PSCell addition.

3. The WTRU of claim 2, wherein the RRC message further indicates a plurality of candidate PSCells associated with the conditional reconfiguration.

4. The WTRU of claim 1, wherein the conditional reconfiguration is associated with an SCG addition or an SCG change.

5. The WTRU of claim 1, wherein the base station is associated with the MCG.

6. The WTRU of claim 1, wherein, responsive to the reception of the RRC message, the processor is further configured to monitor for the condition for application of the conditional reconfiguration.

7. The WTRU of claim 1, wherein the processor being configured to apply the conditional reconfiguration comprises the processor being configured to initiate a random access procedure to a candidate primary secondary cell (PSCell) and wherein the second message is transmitted prior to the random access procedure.

8. The WTRU of claim 1, wherein the condition for application of the conditional reconfiguration comprises a measurement condition for a candidate cell.

9. The WTRU of claim 1, wherein the conditional reconfiguration is associated with a conditional handover.

10. The WTRU of claim 1, wherein the conditional reconfiguration comprises a conditional primary secondary cell (PSCell) change and the processor is further configured to:
    receive a conditional handover command from the base station; and
    prioritize performance of the conditional handover command over performance of the conditional reconfiguration.

11. A method implemented by a wireless transmit receive unit (WTRU), the method comprising:
    performing one or more uplink transmissions via a master cell group (MCG) while a secondary cell group (SCG) is deactivated;
    transmitting an indication regarding the SCG to a base station in response to determining that data associated with the SCG is available for transmission;
    receiving a radio resource control (RRC) message from the base station, wherein the RRC message indicates a conditional reconfiguration of the SCG that includes a primary secondary cell (PSCell) to be applied by the WTRU and a condition for application of the conditional reconfiguration;
    responsive to receiving the RRC message, transmitting a first message to the base station, wherein the first message indicates that the WTRU has received the RRC message;
    determining that the measurement condition for application of the conditional reconfiguration is satisfied;

transmitting a second message to the base station, wherein the second message indicates that the measurement condition for application of the conditional reconfiguration is satisfied;

applying the conditional reconfiguration; and after having transmitted the second message indicating satisfaction of the measurement condition for application of the conditional reconfiguration and based on a determination that the application of the conditional reconfiguration has resulted in a failure based on a timer associated with completing the conditional reconfiguration of the SCG that includes the PSCell expiring, transmitting a third message to the base station, wherein the third message indicates the failure.

12. The method of claim 11, wherein the conditional reconfiguration is associated with a primary secondary cell (PSCell) change or a PSCell addition.

13. The method of claim 12, wherein the RRC message further indicates a plurality of candidate PSCells associated with the conditional reconfiguration.

14. The method of claim 11, wherein the conditional reconfiguration is associated with an SCG addition or an SCG change.

15. The method of claim 11, further comprising, responsive to the reception of the RRC message, monitoring for the condition for application of the conditional reconfiguration.

16. The method of claim 11, wherein applying the conditional reconfiguration comprises initiating a random access procedure to a candidate primary secondary cell (PSCell) and wherein the second message is transmitted prior to the random access procedure.

17. The method of claim 11, wherein the RRC message is received in a master cell group (MCG) and wherein the first message and the second message are transmitted in the MCG.

18. The method of claim 11, wherein the condition for application of the conditional reconfiguration comprises a measurement condition for a candidate cell.

19. The method of claim 11, wherein the conditional reconfiguration is associated with a conditional handover.

20. The method of claim 11, wherein the conditional reconfiguration comprises a conditional primary secondary cell (PSCell) change and the method further comprises:

receiving a conditional handover command from the base station; and prioritizing performance of the conditional handover command over performance of the conditional reconfiguration.

* * * * *

UNITED STATES PATENT AND TRADEMARK OFFICE
CERTIFICATE OF CORRECTION

PATENT NO. : 12,262,275 B2
APPLICATION NO. : 17/764869
DATED : March 25, 2025
INVENTOR(S) : Deenoo et al.

Page 1 of 2

It is certified that error appears in the above-identified patent and that said Letters Patent is hereby corrected as shown below:

In the Claims

Column 46, Line 14: Delete "primary secondary cell (".

Column 46, Line 15: Delete ")".

Column 46, Line 26: Before "condition" insert -- measurement --.

Column 46, Line 31: Delete "primary secondary cell".

Column 46, Line 32: Delete "(".

Column 46, Line 32: Delete ")".

Column 46, Line 34: Before "condition" insert -- measurement --.

Column 46, Line 40: Delete "primary secondary".

Column 46, Line 41: Delete "cell (".

Column 46, Line 41: Delete ")".

Column 46, Line 60: Before "condition" insert -- measurement --.

Column 47, Line 15: Delete "primary secondary cell".

Column 47, Line 16: Delete "(".

Column 47, Line 16: Delete ")".

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,262,275 B2

Column 47, Line 25: Before "condition" insert -- measurement --.

Column 48, Line 3: Delete "primary secondary cell".

Column 48, Line 4: Delete "(".

Column 48, Line 4: Delete ")".

Column 48, Line 7: Delete "a master cell group (MCG)" and insert -- the MCG --, therefor.

Column 48, Lines 11: Before "condition" insert -- measurement --.